US007711532B2

(12) United States Patent
Dulac et al.

(10) Patent No.: US 7,711,532 B2
(45) Date of Patent: May 4, 2010

(54) METHOD FOR BUILDING A THREE DIMENSIONAL CELLULAR PARTITION OF A GEOLOGICAL DOMAIN

(75) Inventors: Jean-Claude Dulac, Sugar Land, TX (US); Jean-Laurent Mallet, Nancy (FR)

(73) Assignee: Paradigm France, Nancy (FR)

( * ) Notice: Subject to any disclaimer, the term of this patent is extended or adjusted under 35 U.S.C. 154(b) by 653 days.

(21) Appl. No.: 11/628,559

(22) PCT Filed: Jun. 2, 2004

(86) PCT No.: PCT/IB2004/002030

§ 371 (c)(1),
(2), (4) Date: Dec. 3, 2006

(87) PCT Pub. No.: WO2005/119304

PCT Pub. Date: Dec. 15, 2005

(65) Prior Publication Data

US 2008/0021684 A1    Jan. 24, 2008

(51) Int. Cl.
*G06F 7/48* (2006.01)
*G06F 17/10* (2006.01)
(52) U.S. Cl. .................... 703/10; 703/2; 702/11
(58) Field of Classification Search .............. 703/2, 703/6, 9, 10; 702/6, 11–13
See application file for complete search history.

(56) References Cited

U.S. PATENT DOCUMENTS 7,412,363 B2 *   8/2008   Callegari .................. 703/6

2005/0114831 A1*   5/2005   Callegari et al. ............ 717/104

FOREIGN PATENT DOCUMENTS

WO     WO 03/050766     6/2003

OTHER PUBLICATIONS

Lixin, W. Topographical Relations Embodied in a Generalized Tri-Prism (GTP) Model for a 3D Geoscience Modeling System, Computers & Geosciences, vol. 30, Iss. 4, May 2004, pp. 405-418.*

(Continued)

*Primary Examiner*—Russell Frejd
(74) *Attorney, Agent, or Firm*—Pearl Cohen Zedek Latzer, LLP

(57) ABSTRACT

The invention concerns a method for building a three-dimensional (3D) cellular partition covering a 3D geological domain by defining the cells of the partition, characterized in that said method comprises the following steps A "3D screen construction step" for constructing a 3D screen which is a 3D elementary partition covering the geological domain, said 3D screen being composed of a plurality of voxels (Vi) which are elementary volume elements, A "voxel painting step" for associating a cell identifier (Cell-id) to each voxel, A "cell definition step" for defining the cells of the geological domain, each cell of the geological domain being defined as the subset of voxels of the 3D screen associated to the same cell identifier, thereby allowing the definition of the cells of the geological domain without having to code the geometry and/or topology of said cells in said geological volume. The invention further provides a "parametric" method and a "cookiecutter" method using such method for building a 3D cellular partition.

54 Claims, 5 Drawing Sheets

OTHER PUBLICATIONS

Courrioux et al., G. 3D Volmetric Modeling of Cadomain Terranes (Northern Brittany, France): An Automatic method Using Voronoi Diagrams, Tectonophysics, vol. 331, Iss. 1-2, Feb. 2001, pp. 181-196.*

"Space-Time Mathematical Framework for Sedimentary Geology" by Jean-Laurent Mallet; *Mathematical Geology*, Vo. 36, No. 1, 2004; pp. 1-32.

"Piecewise Linear Triangulated Surfaces" by Jean-Laurent Mallet; Oxford University Press 2002; *Geomodeling*, Chapter 6; pp. 245-315.

"Generation de Maillages Tridimensionnels Pour la Simulation des Phenomenes Physiques en Geosciences" by Francois Lepage; Ecole National Superieure de Geologie; Oct. 28, 2003; pp. 1-224.

"Modelisation D'Objets Naturels par Formulation Implicite" by David Ledez; Ecole Nationale Superieure de Geologie; Oct. 28, 2003; pp. 1-158.

"Use of Border, Regions for Improved Permeability Upscaling" by X.H. Wen et al.; *Mathematical Geology*, vol. 35, No. 5, Jul. 2003; pp. 521-547.

"New Algorithms.for Euclidean Distance Transformation of an n-Dimensional Digitized Picture with Applications" by Toyofumi Saito et al.; *Pattern Recognition*, vol. 27, No. 11, 1994; pp. 1551-1565.

"Distance Transformations: Fas Algorithms and Applications to Medical Image Processing" by Olivier Cuisenaire; Làboratoire de Telecommunications et Teledetection; Oct. 1999.

"Multiresolution Representation and Visualization of Volume Data" by Paolo Cignoni et al.; *IEEE Transactions on Visualizations and Computer Graphics*; Vo. 3, No. 4, Oct.-Dec. 1997; pp. 352-369.

"Data structures for three-dimensional spatial information systems in geology" by Christopher B. Jones; I*NT. J. Geographical Information Systems*, 1989; vol. 3, No. 1, pp. 15-30.

J-L Mallet, Discrete Smooth Interpolation in Geometric Modelling, Journal of Computer Aided Design, 1992, 178-190, vol. 24. No. 4.

* cited by examiner

FIG.1 – Structured Grid (STATE OF THE ART)
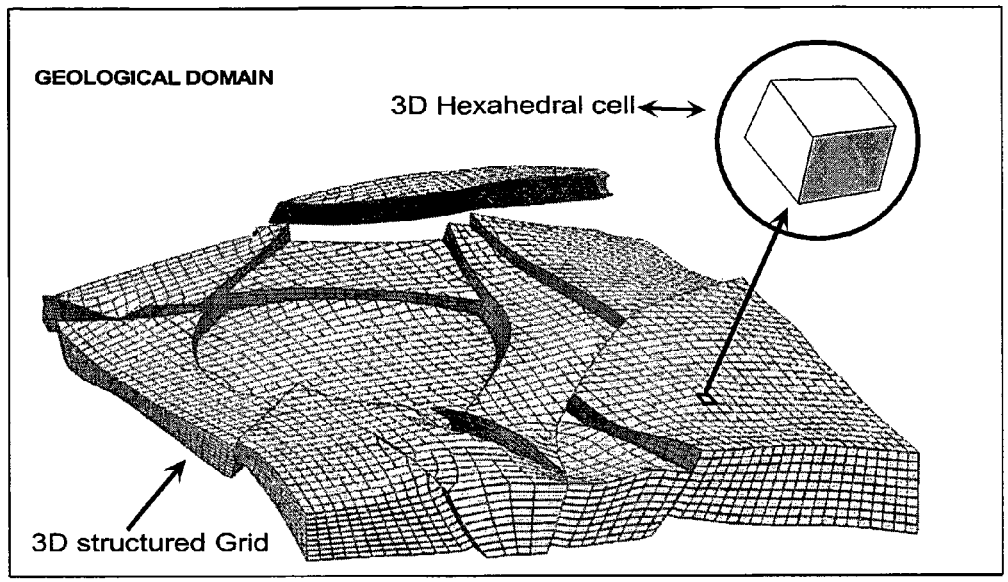
FIG.2 – Non-structured Grid (STATE OF THE ART)
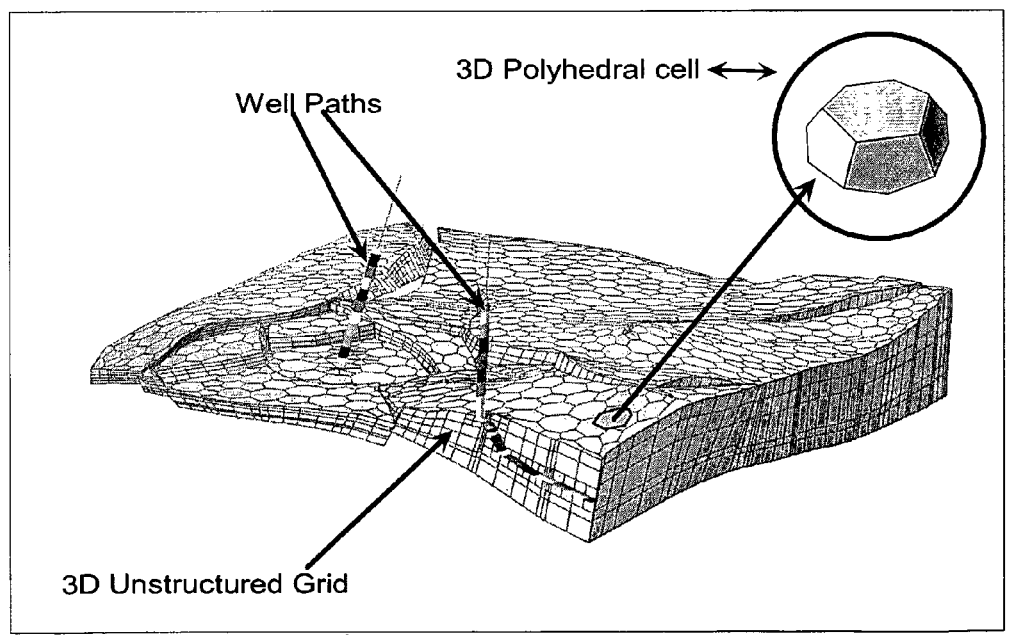

METHOD FOR BUILDING A THREE DIMENSIONAL CELLULAR PARTITION OF A GEOLOGICAL DOMAIN

The present patent application is a non-provisional application of International Application No. PCT/IB2004/002030, filed Jun. 2, 2004.

FIELD OF THE INVENTION

The invention generally concerns the modelling of the behaviour of three-dimensional (3D) domains such as geological volumes.

BACKGROUND OF THE INVENTION

Geological volumes (or reservoirs) are defined as 3D domains which contain fluids (such as oil, gas and/or water).

It is specified that such geological volumes often include singular topological surfaces such as faults, horizons and/or the limits of the reservoir itself.

An "horizon" is defined as an interface between two sub-domains of a geological volume—these subdomains being typically two layers made of different materials.

These singular surfaces can furthermore be irregular.

The modelling of the behaviour of geological volumes aims in particular at simulating the flow of fluids through and within the geological volume.

Such simulation is carried out by software programs which compute the behaviour of finite volumes (called "cells"), which cells form a partition of the geological volume.

This partition (also called "grid") represents the geological volume in the "geological domain" (i.e. in the actual physical domain where the geological volume is).

Software programs such as mentioned above are referred to as "flow simulators".

In order to run a flow simulator, it is therefore necessary to build cells which form a partition of the geological volume.

Each cell of such a partition is associated to some information which has to be memorized in the computer system which runs the flow simulator.

This information typically include for any given cell C0:
The volume of C0,
The permeability tensor of C0,
The list of the cells which are adjacent to C0,
For each cell C1 adjacent to C0, the parameters defining the common face shared by C0 and C1.

Until recently, two types of known methods have been used for building 3D partitioning (or 3D "grids") consisting of sets of adjacent cells as mentioned above.

Such 3D grids can be "structured" (as illustrated in FIG. 1) or "non-structured" (as illustrated in FIG. 2).

In both cases, it is necessary to adapt the geometry of the cells in order to run the flow simulator as efficiently as possible.

In particular, the geometry of the cells has to be defined so as to avoid undesirable effects such as having cells intersecting singular surfaces (such as mentioned above) of the geological volume.

Other constraints are associated to the definition of such cells defined in the geological domain: among others, these cells must be aligned with minimal distortion and/or size variation.

Such construction of the cells in the geological domain therefore implies constraints associated to the definition of the geometry and topology of the cells.

These constraints can make the process of building the cells very complex, in particular because the construction of the cells as mentioned above implies coding:
the geometry of the cells (in particular the geometry of the faces of each cell), and
the topology of the cells (in particular information describing the faces of the cells and information allowing the identification of the cells adjacent to any cell).

This constitutes a drawback of such construction of the cells.

Furthermore, to be honored, these constraints often necessitate to make approximations and/or simplifications on the geometry/topology of the singular surfaces of the geological volume.

Also, they imply that the geometry and topology of the cells has to be memorized, in association with the information mentioned above. This increases the memory space which is required in the computer system used for running the flow simulator.

Moreover, when considering a given point of the geological volume, the process of finding which cell said point is associated to typically necessitate to scan all (or a large number of) cells to find out if the point is contained in the cell. This makes the exploitation of the cell grid burdensome.

Finally, the determination of the permeability tensor of a cell can reveal quite difficult, specially in the case of a non structured grid.

It thus appears that the known methods for building cells are associated to some drawbacks and limitations.

It is to be noted that an advanced approach has been proposed recently for modelling the properties of the cells (but not for building said cells).

This approach has been described in "Space-time mathematical framework for sedimentary geology" (Mathematical Geology, Vol. 36, N° 1, 2004).

This advanced approach implies the association of the geological domain with a parametric domain where singular surfaces such as faults and horizons can be managed in a simple manner.

And WO 03/050766 discloses a method for the 3D modelling of a geological volume which presents a variant which can be used in combination with the advanced approach mentioned above.

However, the method disclosed in WO 03/050766 still requires the definition of the cells in the geological domain in order to model the geological volume.

Thus, the method disclosed in WO 03/050766 does not resolve in itself the drawbacks and limitations mentioned above.

An objective of the invention is to avoid these drawbacks and limitations.

SUMMARY OF THE INVENTION

In order to reach the objective mentioned above, the invention proposes a method for building a three-dimensional (3D) cellular partition covering a 3D geological domain by defining the cells of the partition, characterized in that said method comprises the following steps:

A "3D screen construction step" for constructing a 3D screen which is a 3D elementary partition covering the geological domain, said 3D screen being composed of a plurality of voxels which are elementary volume elements, A "voxel painting step" for associating a cell identifier to each voxel, A "cell definition step" for defining the cells of the geological domain, each cell of the geological domain being defined as the subset of voxels of the 3D screen associated to the same cell identifier, thereby allowing the definition of the cells of the geological domain without having to code the geometry and/or topology of said cells in said geological volume.

Specific aspects of such method are the following:
The method further comprises associating to each voxel an individual index information which characterizes the location of said voxel in the 3D screen and allows the retrieving of the voxels neighbouring said voxel in the 3D screen.

The invention further provides a "parametric" method using a method as mentioned above, characterized in that said parametric method further comprises the following steps:
Constructing three transfer functions defined from the geological domain to a parametric domain for associating each point in the geological domain to an image point in the parametric domain,
Partitioning the parametric domain into parametric cells,
Associating a respective cell identifier to each parametric cell of the parametric domain, each parametric cell being individually associated to a respective cell identifier,
After the 3D screen construction step, associating to each voxel of the 3D screen the cell identifier of the parametric cell in the parametric domain which contains the image point of a point contained in said voxel.

Preferred, but non limiting aspects of such parametric method include the following:
the parametric domain is a 3D domain and three transfer functions are respectively defined from the geological domain into one of the three respective dimensions of the parametric domain,
said or one of said transfer function is defined so that the image of each horizon of the geological domain is a plane in the parametric domain,
the partitioning of the parametric domain into parametric cells is carried out in such a way that no edge or face of a parametric cell crosses a plane corresponding to an image of an horizon of the geologic domain,
said transfer functions are built according to the GeoChron model,
the building of said transfer functions implies the following operations:
Covering the geological domain with a 3D mesh consisting of adjacent polyhedra whose edges never cross the fault surfaces of the geological domain, each of said polyhedra being a tetrahedron or the union of adjacent tetrahedra,
Reserving memory slots for coordinate(s) in the parametric domain associated to each vertex of each tetrahedron,
Assuming that the transfer functions are linear inside each tetrahedron and that each transfer function is thus fully defined within said tetrahedron by its values at the vertices of said tetrahedron,
Computing the values of a given transfer function at the vertices of said tetrahedral of the geological domain,
Computing the values of the transfer function(s) other than said given transfer function (t), at the vertices of said tetrahedral of the geological domain,
each of said coordinate(s) corresponds to a sampling value for a respective transfer function at the location of a tetrahedron vertex and the computation of the transfer function(s) is carried out at the location of each vertex of a tetrahedron in the parametric domain,
said computation of the values of said given transfer function is made with a DSI method carried out on the basis of the values of said given transfer function at horizons of the geological domain, said given transfer function being assumed to have a respective constant value on each given horizon of the geological domain,
said computation of the values of said given transfer function is made at the location of each vertex of each tetrahedron with a DSI method carried out on the basis of the values of said given transfer function at each horizon of the geological domain,
said polyhedra are chosen as tetrahedral,
said computation of the values of said other transfer function(s) is carried out through the following steps
Defining a reference surface in the geological domain,
Computing said values of each of said other transfer function(s) through a DSI method carried out on the basis of the values of said other transfer function at said reference surface of the geological domain,
said reference surface of the geological domain is chosen as an horizon of said geological domain,
said reference surface of the geological domain is chosen as an horizon which intersects a maximum number of faults blocks of the geological domain,
there are two said other transfer-functions defined on said reference surface and said reference surface is chosen so that on said reference surface the gradients of a first of said other transfer function are as much orthogonal as possible to the gradients of the second of said other transfer function and said gradients have as much as possible constant lengths,
said DSI method for computing the values of a transfer function on the basis of the values of said transfer function at the image of a horizon surface implies the following steps:
Discretizing said horizon surface as a finite set of points considered as DSI Control Points,
Computation of said transfer function at DSI Control Points on said horizon surface,
For each DSI Control Point:
Identification of the tetrahedron which contains the DSI Control Point,
Formulation of a DSI constraint associated to the DSI Control Point, said DSI constraint corresponding to equating the barycentric mean of the values of said transfer function at the vertices of said tetrahedron to the known value of said transfer function at said DSI Control Point,
said DSI method for computing the values of a transfer function further comprises applying to the values of said transfer function at the vertices of the tetrahedra a smoothing condition linking the values of said transfer function at the vertices of neighbouring tetrahedra of the geological domain,
said smoothing condition is a condition of a minimal difference between the value of said transfer function at a given tetrahedron vertex location and an average value at neighbouring tetrahedron vertices in the geological domain,
said smoothing condition for any pair of adjacent tetrahedra consists in specifying that the gradients of said transfer functions should be as equal as possible in said adjacent tetrahedral,
said smoothing condition for any pair of adjacent tetrahedron consists in specifying that the respective projections, on the normal vector to the common face shared by said two adjacent tetrahedra, of the gradients of said transfer functions in said adjacent tetrahedra, should be equal, the computation of said two other transfer functions is carried out using the knowledge of the earlier computation of said given transfer function, the method further comprises specifying that within each tetrahedron the gradient of each of said two other transfer functions is orthogonal to the gradient of said given transfer function, within each tetrahedron the method further comprises specifying that the gradients of said two other transfer functions are constrained to be orthogonal between them, and the respective lengths of said gradients of said two other transfer functions are constrainted to be substantially equal, said point contained in the voxel and whose image point is contained in the parametric cell having a Cell-id which is associated to the voxel is an arbitrary point of the voxel, The invention also provides a "cookie-cutter" method using a method for building a three-dimensional cellular partition as mentioned above, said cookie-cutter method further comprising the following steps:

Associating to each geological layer of the geological domain a respective layer identifier, each layer being individually associated to a respective layer identifier, Partitioning a reference surface of the geological domain into polygons, Associating a respective polygon identifier to each polygon used to partition said reference surface, each polygon being individually associated to a respective polygon identifier, Defining a layer-polygon function which associates a value to each pair formed of a Layer identifier and a Polygon identifier in such a way that each pair is associated to a respective value generated by said layer-polygon function and consisting of a valid cell identifier, Computing for each voxel of the geological domain a voxel value of said layer-polygon function which is the output of said layer-polygon function computed on the basis of:
 the Layer identifier of the layer containing said voxel, and
 the Polygon identifier of the polygon of said reference surface which contains the projection of a reference point of said voxel over said reference surface, along a projection direction, Associating to each voxel a cell identifier which is equal to the voxel value of the layer-polygon function computed at a reference point contained in the voxel.

Preferred, but non limiting aspects of such "cookie-cutter" method include the following:

the method comprises constructing a transfer function defined in the geological domain for associating each in the geological domain to a value, the building of said transfer function implies the following operations:

Covering the geological domain with a 3D mesh consisting of adjacent polyhedra whose edges never cross the fault surfaces of the geological domain, each of said polyhedra being a tetrahedron or the union of adjacent tetrahedra, Reserving memory slots for the values of said transfer function at each vertex of each tetrahedron, Assuming that the transfer function is linear inside each tetrahedron and that said transfer function is thus fully defined within said tetrahedron by its values at the vertices of said tetrahedron, Computing the values of said transfer function at the vertices of all tetrahedral of the geological domain, said reference surface is an horizontal plane of the geological domain, said projection direction is the vertical direction of the geological domain, said reference point of each voxel is the centre of the voxel.

It is also to be noted that preferred but non limiting aspects of the method for building a three-dimensional cellular partition as mentioned above include the following:

the voxels are defined so that the volume of each voxel is significantly smaller than the volume of the cell of the geological domain which contains the voxel, the ratio of the volume of each voxel to the volume of the cell of the geological domain containing said voxel is at least 1:50, said method includes a post-processing of desired voxels in order to selectively modify the cell identifiers of said voxels after the cell definition step, said post-processing is applied to voxels primarily associated to the cell identifier of a first cell, and being adjacent to a border of said first cell with a second cell, and the new cell identifier associated to said voxel is the cell identifier of said second cell, after the cell definition step the method further comprises the retrieving of the voxels contained in a cell which also contains a given voxel, by exploring recursively from said given voxel through successive concentric rings all the voxels which are associated to the same cell identifier as said given voxel, after the cell definition step the method further comprises the identification of the cells adjacent to a cell containing a given voxel by retrieving the voxels which are associated to a cell identifier different from the cell identifier of said cell containing said given voxel and are also adjacent to at least one voxel of said cell containing said given voxel, after the cell definition step the method further comprises the computation of the volume of any given cell as being equal to the sum of the volumes of all the voxels associated to the same cell identifier as a given voxel of said given cell, the method further comprises after the cell definition step the construction for any given pair of adjacent cells of the face separating said two adjacent cells, said face being built as the set of all pairs of adjacent voxels such that a first voxel of said pair belongs to a first of said two adjacent cells and the second voxel of said pair belongs to the second of said two adjacent cells, in association with each voxel the cell identifier associated to the voxel is memorized, in association with each voxel at least a parameter representative of a physical property of the geological volume corresponding to the voxel is also memorized, said at least one parameter representative of a physical property of the geological volume corresponding to the voxel is limited to one scalar permeability parameter, the method further comprises the computation of a tensor of permeabilities for each cell, said computation being deduced from scalar permeabilities associated to the voxels of said cell, the computation of a tensor of permeabilities of a cell is further based on scalar permeabilities associated to some voxels in the neighbourhood of said cell, said 3D screen consists of a plurality of adjacent hexahedral voxels aligned according to three sets of straight lines corresponding to the three dimensions of the geological domain, the lines of each set are regularly spaced and all voxels of the 3D screen are identical, the method includes a specific post-processing of cells associated to some singular geological surfaces within the geological domain by memorizing the equations of said singular surfaces and dividing each cell of the three-dimensional partition which is intersected by such singular surfaces into at least two subcells, each subcell being entirely located on a same side of said singular surface, the singular surfaces which are treated specifically include fault surfaces of the geological volume, said dividing of cells traversed by said singular surfaces include the following steps:

For each traversed cell, defining subsets of voxels whose centres are all located on a same side of said singular surface, Assigning to each such subset of voxels a new cell identifier which is different from the cell identifiers assigned to other cells.

Assigning to all voxels of each such subset of voxels a new cell identifier equal to the cell identifier assigned to the subset of voxels it belongs to, the method includes a specific post-processing of some specific volumes within the geological domain by defining the cells of said specific volumes with an "indirect" method which comprises the following steps for each of said specific volumes:

Reseting the Cell-id of all voxels within said volume,

Defining for each cell to be defined within said specific volume a "kernel", each kernel being composed of one or more voxels, Associating to each kernel a Cell-id which has not been still assigned, Associating to each voxel within said specific volume the Cell-id of the kernel which is closest to said voxel, Defining each cell of said specific volume as the subset of voxels of the 3D screen associated to the same Cell-id, in order to obtain a given desired geometry for an interface between two cells which are to be defined within a said specific volume according to said indirect method, respective kernels of said two cells are defined as follows:

A kernel is defined for a first of said two cells to be defined with at least a voxel of a first of said two cells, said voxel being chosen so as to be bordering or close to the desired interface, For each voxel of said kernel of a first cell to be defined ("first voxel") and bordering or close to the desired interface, the voxel ("symmetrical voxel") which is symmetrical of said first voxel with reference to the desired interface is identified, A kernel is defined for the second of said two cells to be defined, with the symmetrical voxel(s) thus defined, the kernels positions and the kernel density are defined so as to obtain a desired general configuration for the cells of said specific volumes, said specific volume is defined by a given distance around a well path of the geological volume and the kernels are defined so that within said specific volume the kernel density is higher in the vicinity of said well path, specific volume is defined by a region of rapid variation of at least one physical property and the kernels are defined so that they are associated to a local density which is related to the intensity of heterogeneity of said physical property.

DESCRIPTION OF THE DRAWINGS

Other aspects, goals and advantages of the invention shall be apparent from the description given hereunder in reference to the drawings on which, in addition to FIGS. 1 and 2 which have already been commented in reference to the state of the art.

DETAILED DESCRIPTION OF THE PREFERRED EMBODIMENTS

General Aspects of the Invention

Figure 3A:
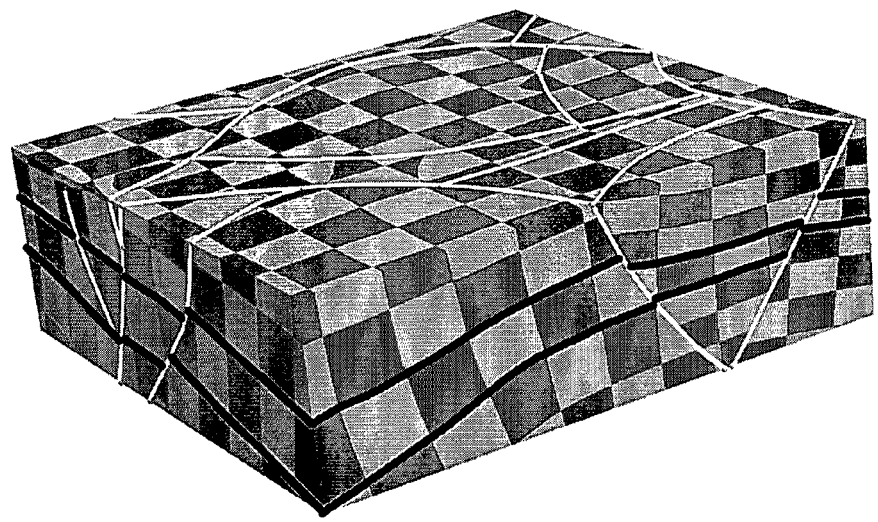
FIG. 3 is a representation of a 3D cell partition built according to a "parametric" method of the invention (this figure comprising an upper part 3a which shows only the cell partition with some singular surfaces, and a lower part 3b which is equivalent but comprises in addition details on the cells of the partition and on some singular surfaces of the geological domain)
Figure 3B:
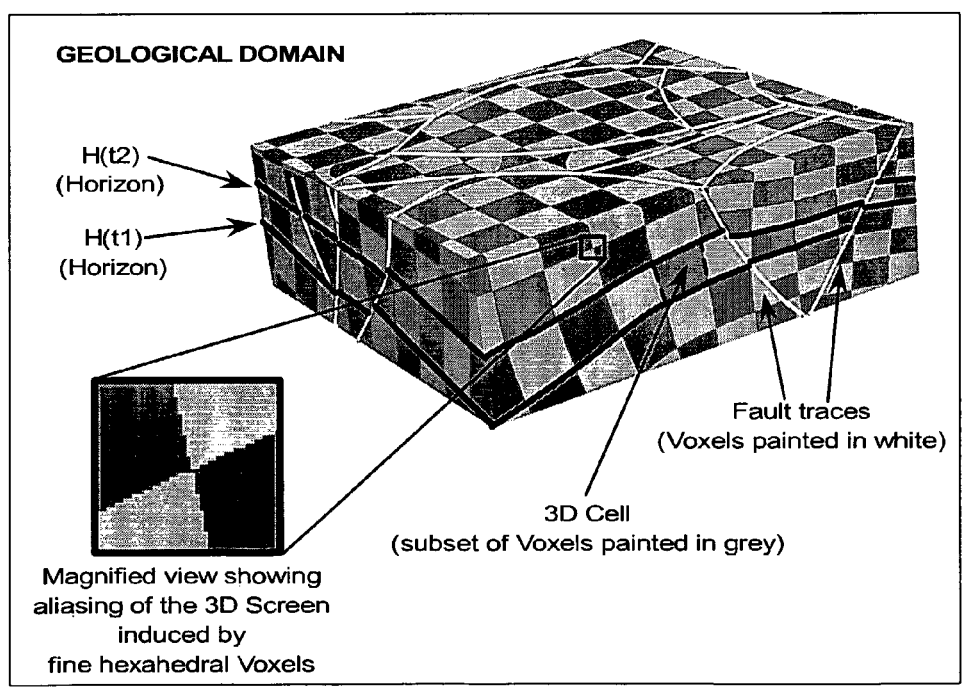

FIG. 3 shows a 3D cell partition built according to the invention. This cell partition covers a geological domain.

As will be explained in details in this description, the method of the invention comprises the following steps A "3D screen construction step" for constructing a 3D screen which is a 3D elementary partition covering the geological domain, said 3D screen being composed of a plurality of voxels (Vi) which are elementary volume elements, A "voxel painting step" for associating a cell identifier (Cell-id) to each voxel, A "cell definition step" for defining the cells of the geological domain, each cell of the geological domain being defined as the subset of voxels of the 3D screen associated to the same cell identifier, thereby allowing the definition of the cells of the geological domain without having to code the geometry and/or topology of said cells in said geological volume.

The 3D screen construction step consists in building a "3D screen" which is a partition of the geological domain to be covered by the cell partition which is to be built.

This 3D screen is a 3D partition of the geological domain which is different from the partition corresponding to the cells to be built.

The 3D screen is composed of elementary volume elements which shall be called "voxels", and associated with the general reference V or Vi.

The voxels are the elementary volume elements from which the cells shall be built.

The 3D screen can typically be constructed as a 3D grid of adjacent hexahedral voxels aligned according to three sets of straight lines corresponding to the three dimensions (x,y,z) of the geological domain.

These straight lines can be regularly spaced so as to define a single spacing between two adjacent lines in one of the three sets of lines which correspond to the three dimensions of the geological domain. In this configuration, all voxels of the 3D screen would be identical. As an illustration, some voxels of a 3D screen are represented in the lower left part of FIG. 6.

Figure 7:
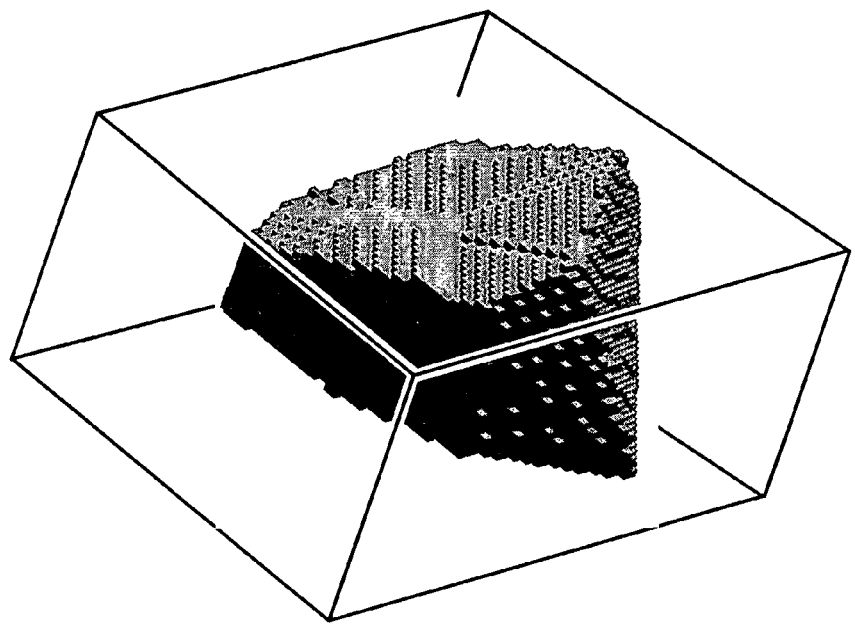
FIG. 7 is an enlarged view of a cell built according to the invention, with a subset of voxels associated to the same cell identifier.

As mentioned above, the voxels are the elementary volume elements from which the cells shall be built (i.e. a given cell of the cell partition to be built shall be composed of a plurality of voxels, as illustrated in FIG. 7). For that purpose, it is necessary that the size of the voxels be defined as significantly smaller than the size which is expected/desired for the cells.

As an illustration, for example a ratio of 1:50 between the size of a given cell of the cell partition and the size of the voxels contained within said cell is well adapted. Of course, a ration of 1:X with X>50 would also be adapted.

Each voxel Vi is associated to an individual index information (which can be noted Loc(Vi)), which characterizes the location of the voxel in the 3D screen.

This information identifies the voxel unambiguously. It is specified that the invention is to be embodied on a computation system such as a computer (personal or not), or any equivalent device equipped with processing means, display means and memory means.

Loc(Vi) can be e.g. (i,j,k) where i, j and k are indexes (or coordinates) which allow the position of the associated voxel Vi in the referential of the 3D screen to be defined.

To that end said referential is composed of the three axis (X,Y,Z) of the geological domain, each axis being associated to a respective increment DX, DY, DZ along the axis.

The indexes i, j and k thus allow to define the position of a reference point of the voxel, said reference point being noted Q and having coordinates (x,y,z) in the referential of the geological domain.

Said reference point can be defined by convention as e.g. the centre of the voxel, or one of its vertices.

Assuming that the three dimensions of the 3D screen are parallel to the three respective axis X, Y, Z of said referential and that all voxels are identical, the searched voxel shall be identified by a given line (i), column (j) and plane (k) of the 3D screen. These elements are found as follows:

$i$=integer part of $(x-x0)/DX$, $j$=integer part of $(y-y0)/DY$, $k$=integer part of $(z-z0)/DZ$, with (x0,y0,z0) the coordinates in the referential of the geological domain of the origin of the 3D screen and (DX,DY,DZ) the respective dimensions of each voxel along directions X, Y, Z It is also possible to define the individual index information by other means, e.g. by a serial number (in this case, the series along which the voxels are indexed comprises all voxels of the geological domain, arranged along a predetermined order).

After having defined the 3D screen and its voxels, a "voxel painting step" aims at associating a cell identifier (Cell-id) to each voxel.

For that purpose, two main embodiments of the invention can be used: a "parametric" method, or a "cookie-cutter" method. It is to be noted that these names have been chosen for practical purposes only, and in particular the "cookie-cutter" method does imply some parameterization as well.

The details of these two methods shall be given herebelow.

During this voxel painting step, each voxel is associated to a "cell identifier" (referred to as "Cell-id"). A given Cell-id is normally associated to several voxels.

Once the voxels of the 3D screen have been "painted" (i.e. associated each to a Cell-id), a "cell definition step" allows defining the cells of the geological domain, each cell of the geological domain being defined as the subset of voxels of the 3D screen associated to the same Cell-id.

Such method allows the definition of the cells of a partition of the geological domain, without having to code the geometry and/or topology of said cells in said geological volume.

It has been said that two main methods could be used for painting the voxels of the 3D screen.

Moreover, it is specified that these two methods ("parametric" and "cookie-cutter") are both referred to as "direct" methods which means that they allow a direct association of a Cell-id to each voxel of the 3D screen.

As will be explained, such "direct" methods can be combined with an "indirect" method, which is a post-processing of some specific volumes within the geological domain.

And this combination of a direct method which resulted in a first association of a Cell-id to each voxel, with an indirect method which is a post-processing of some voxels for which the Cell-id is first reset then redefined, is referred to as an "hybrid" method.

The "Parametric" Method—General Aspects

The parametric method involves the following steps:

Constructing at least one transfer function defined from the geological domain to a parametric domain for associating each point (x,y,z) in the geological domain to an image point (u,v,t) in the parametric domain. In the example commented in this text, three transfer functions (u=u(x,y,z), v=v(x,y,z), t=t(x,y,z)) are defined for this parametric method, Partitioning the parametric domain into parametric cells (this being done with any method known in the art), Associating a respective cell identifier (Cell-id) to each parametric cell of the parametric domain, each parametric cell being individually associated to a respective cell identifier, After the 3D screen construction step, associating to each voxel of the 3D screen the cell identifier of the parametric cell in the parametric domain which contains the image point (u,v,t) of a reference point (x,y,z) contained in said voxel.

The parametric domain is thus a domain which is used for defining Cell-ids, and which is associated to the geological domain through three transfer functions.

Figure 5:
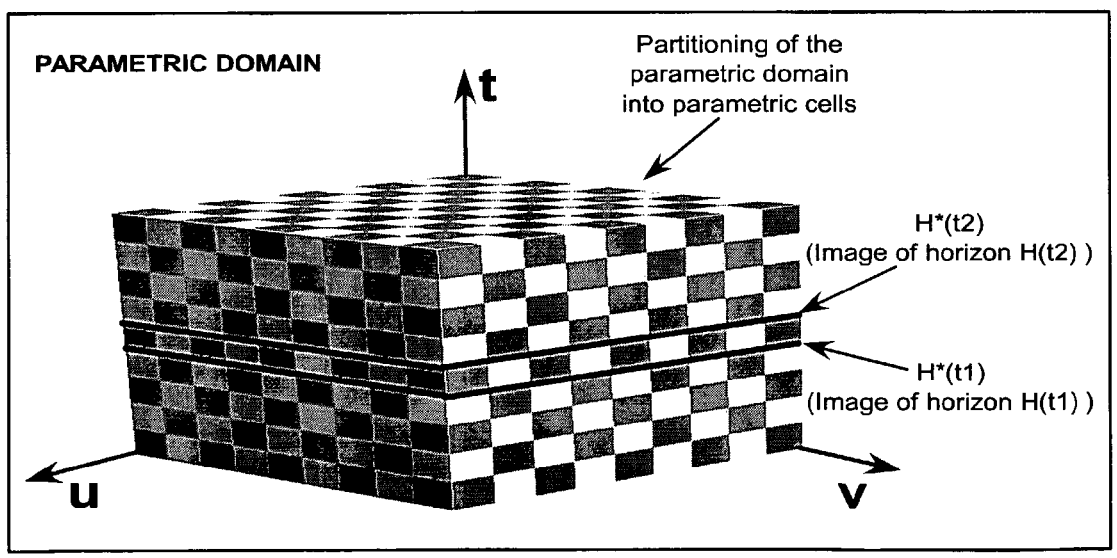
FIG. 5 is a representation of parametric cells defined in a parametric domain, for a "parametric" version of the method according to the invention.

Among the transfer functions used for establishing a correspondence between the geological and parametric domains, one transfer function is defined so that the image of each horizon of the geological domain is a plane in the parametric domain (regarding this aspect reference is made in particular to FIGS. 3 and 5 which will be further commented in this text).

This particular transfer function is referred to as $t=t(x,y,z)$.

Furthermore, in the parametric domain the discontinuities of the geological domain corresponding to faults have disappeared, i.e. the images of points located on opposite sides of such faults in the geological domain The partitioning of the parametric domain into parametric cells should be carried out (with any method known in the art) in such a way that no edge or face bordering a parametric cell crosses a plane corresponding to an image of an horizon of the geologic domain through the transfer functions.

Thus, the transfer functions to be built have to meet the following requirements:

The image through the transfer functions u, v and t of any point $Q(x,y,z)$ of the geological domain having coordinates x,y,z in the referential of said geological domain is a point $Q^*(u,v,t)$ having coordinates $(u,v,t)$ in the parametric domain, so that $u=u(x,y,z)$, $v=v(x,y,z)$, $t=t(x,y,z)$, As shown in FIGS. 3 and 5, the image of any horizon H of the geological domain (i.e. a singular surface of the geological domain separating two different layers having different geological compositions) is an horizontal plane H* of the parametric domain («horizontal» is defined in the parametric domain as meeting the condition t is constant), this being true even if H is a surface with faults and/or folds, In the parametric domain, all discontinuities associated to a fault have disappeared.

A practical way to build such transfer functions is to use the GeoChron method (see Mallet, J. L., (2004)—Space-Time Mathematical Framework for Sedimentary Geology. Math. Geol., V. 36, No. 1, pp. 1-32).

In practice, the transfer functions ($u=u(x,y,z)$, $v=v(x,y,z)$, $t=t(x,y,z)$) are thus built according to the GeoChron model as described in "Space-time mathematical framework for sedimentary geology" (Mathematical Geology, Vol. 36, N° 1, 2004).

Figure 4:
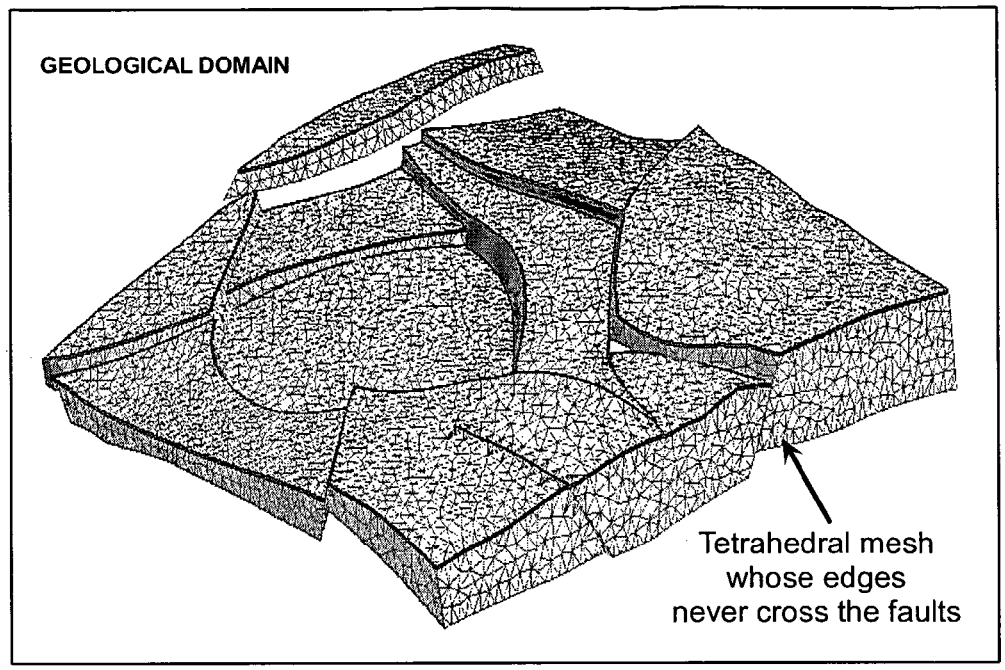
FIG. 4 is a representation of a mesh of tetrahedra established on a geological domain, in order to carry out the method according to the invention.

As suggested in this article, the construction of this 3D parameterization "GeoChron" model is based on the DSI interpolator (Mallet—2002: Geomodeling—Oxford University Press) and is implemented as follows:

The geological domain is covered by a 3D mesh consisting of adjacent polyhedra whose edges may be tangent to fault surfaces but never cross these fault surfaces (as illustrated in FIG. 4).

This mesh is distinct from the grid formed by the 3D screen, and from the 3D grid which will be obtained once the cells are defined.

As illustrated on FIG. 4 which shows such a mesh based on tetrahedra, the polyhedra are typically tetrahedra, or polyhedra which can be divided into tetrahedra. In the case of polyhedra formed by several adjacent tetrahedra, each tetrahedron shall be treated separately, and we will therefore refer to "tetrahedra" hereinafter, Memory slots are reserved for the coordinates (u,v,t) of the image of each vertex of each tetrahedron in the parametric domain, It is assumed that the transfer functions are linear inside each tetrahedron and therefore each transfer function is fully defined within said tetrahedron by its values at the vertices of said tetrahedron, and the gradient of each such transfer function is constant within a given tetrahedron, The values of the transfer function $t(x,y,z)$ within the parametric domain are first computed, The values of the other transfer functions ($u(x,y,z)$, $v(x,y,z)$) within the parametric domain are then computed.

The storage and exploitation of the values of the transfer functions at the vertices of the tetrahedra is carried out according to the method described in WO 03/050766.

For ensuring that the transfer function t has a constant value over any horizon of the geological domain, a new variant of the DSI technique is implemented. (details on this new variant of the DSI technique which uses specific smoothness constraints shall be reminded herebelow).

For that purpose, so called "Control Points" DSI constraints are installed to specify that horizons H of the geological domain should correspond to constant isovalue surfaces for the parameter $t=t(x,y,z)$ interpolated at the vertices of the tetrahedra.

Once the values of the transfer function t have been computed at the vertices of the tetrahedra, the values for the other transfer functions (u,v) are also computed at the same locations.

For that purpose, a reference surface is chosen in the geological domain and then values of $u=u(x,y,z)$ and $v=v(x,y,z)$ are computed on this reference surface in such a way that, on this reference surface, the isovalue lines of $u=u(x,y,z)$ and $v=v(x,y,z)$ be as much as possible orthogonal.

The "reference surface" is typically an horizon of the geological domain.

The values of u and v are then computed for all the vertices of all tetrahedra of the geological domain (and hence for all points of this geological domain), using a DSI technique.

More precisely, DSI constraint are installed to specify that from the values computed for the reference surface, the functions $u=u(x,y,z)$, $v=v(x,y,z)$ are extrapolated at the vertices of all the tetrahedral of the geological domain in such a way that the gradients of these functions be as much as possible orthogonal and have smooth variations.

The DSI method is then applied to compute the values of the transfer functions $u=u(x,y,z)$, $v=v(x,y,z)$, $t=t(x,y,z)$ at the vertices of all the tetrahedra while honouring all the DSI constraints defined above.

Given the fact that the transfer functions are linear within any tetrahedron, the values of the transfer functions at the vertices of the tetrahedra give access to the values of these functions for any point of the geological domain, by linear interpolation as a function of the position of said point within a given tetrahedron.

Once the transfer functions $u=u(x,y,z)$, $v=v(x,y,z)$, $t=t(x,y,z)$ have been fully defined on the geological domain, the partition of the geological domain into cells is carried out through the following steps:

For each voxel V of the 3D screen, a memory position I(V) is reserved in order to memorize the Cell-id which shall be associated to the voxel, All Cell-ids of the voxels of the 3D screen are set to an initial value «Cell-Undef» which by convention corresponds to an invalid Cell-id, The parametric domain is partitioned into parametric cells, as mentioned above, so as to produce a set CLIST* of parametric cells CLIST*={C1*, C2*, ..., Cn*}.

A simple way to proceed is to define the parametric cells as adjacent hexahedric cells in which each edge is parallel to one of the three axis u,v,t of the parametric domain.

It is specified that the size of the parametric cells can be adapted locally so as to e.g. take into account local variations of permeability (a preferred application of the invention is to run a flow simulator after having associated to each cell a permeability tensor).

As an illustration and as represented in FIG. 5, the parametric domain can be compared to a box CLIST* of hexahedric parallepipedic sugar pieces, each parametric cell corresponding to one of these sugar pieces.

It is to be noted that the illustration of FIG. 5 furthermore shows than such hexahedric parallepipedic "sugar pieces" parametric cells define iso-t levels, each level corresponding to a given value of t. On the particular representation of FIG. 5, two such "iso-t" levels H*(t1) and H*(t2) are associated to the respective images through the transfer functions of horizons H(t1) and H(t2) illustrated in FIG. 3.

It is also specified that the parametric cells can be obtained using any griding method known in the art for generating cells whose edges never cross the planes corresponding to the images of the horizons through the transfer functions (these planes being orthogonal to the t axis).

Each parametric cell Ck* is then individually associated to a respective Cell-id, so that two different parametric cells are associated to two different Cell-ids, On the basis of this association of Cell-ids to the parametric cells, a function I*(u,v,t) is defined within the parametric domain. This function associates to any point (u,v,t) of the parametric domain the Cell-id of the parametric cell containing said point, The Cell-id of any given voxel V of the geological domain is then defined as follows:

The coordinates (x,y,z) of a reference point Q of the geological domain which is individually associated to the voxel V (e.g. its centre) are determined, The coordinates u=u(x,y,z), v=v(x,y,z) and t=t(x,y,z) of the point Q*(u,v,t) image of Q(x,y,z) in the parametric domain are determined, The Cell-id I*(u,v,t) is associated to the voxel V.

After these steps, the Cell-id I(V) of a given voxel V is either:

The Cell-id of a cell Ck whose image in the parametric domain is included into a parametric cell of the set CLIST*, or The code "Cell-Undef" if V does not belong to any cell of the partition to be built.

As illustrated in FIG. 3, most of the cells built this way in the geological domain have an hexahedric shape. This is advantageous in the perspective of the use of the cell partition of the geological domain with numerical tools such as a flow simulator, which performance increases with hexahedric cells.

Figure 6:
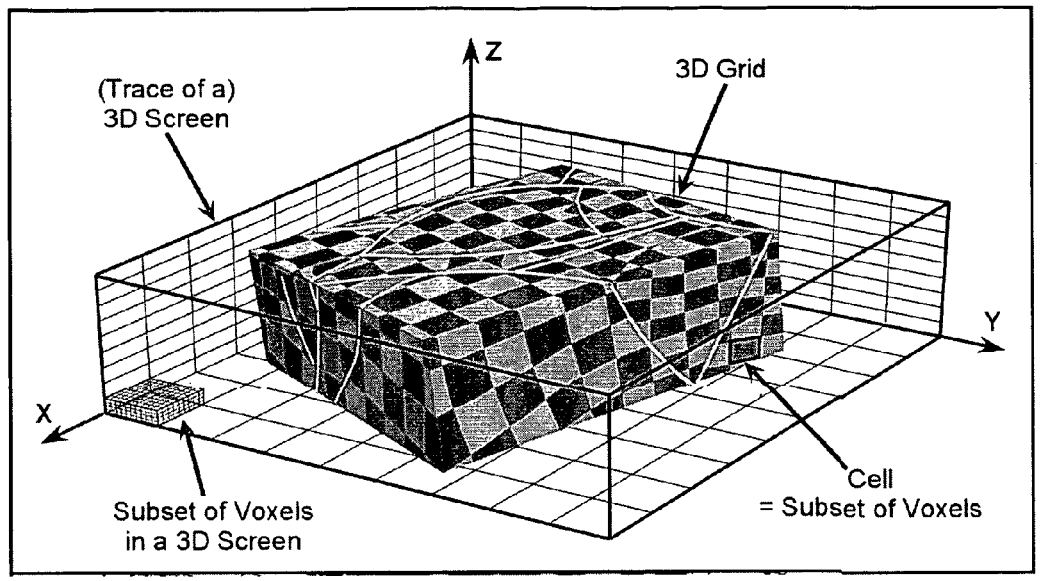
FIG. 6 is a representation of a partition of a geological domain into polyhedric cells, obtained through a method according to the invention, this figure showing in particular elements associated to the 3D screen used to build the cells.

FIG. 6 provides another illustration of a 3D cell partitioning obtained by a method according to the invention, this figure showing in particular:

The grid of hexahedric cells which is obtained,

The trace on the borders of the geological domain of the 3D screen, as well as a part of said 3D screen with its voxels individually represented (in the lower left part of the domain), The reference axis X, Y and Z for the referential of the geological domain.

The GeoChron Model and the DSI Technique

There are potentially many possible implementation methods to build the functions u(x,y,z), v(x,y,z) and t(x,y,z), some few of them being sketched in (Mallet—Space-Time Mathematical Framework for Sedimentary Geology—Math. Geol., V. 36, No 1, pp. 1-32—2004).

However, as mentioned above, the GeoChron model (presented e.g. in Mallet—Space-Time Mathematical Framework for Sedimentary Geology—Math. Geol., V. 36, No 1, pp. 1-32—2004) can advantageously be used in the parametric method for building the transfer functions t=t(x,y,z) and (u=u(x,y,z), v=v(x,y,z)).

This GeoChron model is used in combination with the so-called DSI technique, presented in Mallet: Discrete Smooth Interpolation in Geometric Modeling—Journal of Computer Aided Design—1992 and extensively developed chapter 4, page 139 to 197 in Mallet: Geomodeling—Oxford University Press—2002.

It is specified that the other main direct method—the "cookie-cutter" method—also uses the GeChron model and a DSI technique, but only for computing the values of the transfer function t(x,y,z).

According to the GeoChron model, it is sought to obtain transfer functions whose gradients fulfil, at any location (x,y,z) in the geologic domain, the following criteria (for the cookie-cutter method, only the aspects relating to the function t are to be considered):

The gradients of u(x,y,z) and v(x,y,z) are, as much as possible, orthogonal to the gradient of t(x,y,z), The gradients of u(x,y,z) and v(x,y,z) are, as much as possible, mutually orthogonal and have the same magnitude, The gradients of u(x,y,z), v(x,y,z) and t(x,y,z) are never equal to the null vector.

Respecting such criteria ensures that the magnitude of the strain tensor defined page 19 in Mallet—Space-Time Mathematical Framework for Sedimentary Geology—Math. Geol., V. 36, No 1, pp. 1-32—2004 and induced by the parameterization of the transfer functions is minimized.

As mentioned above and as illustrated in FIG. 4, the geological domain has been partitioned into polyhedra which are tetrahedra, or can be decomposed each into adjacent tetrahedra.

Therefore, we will consider hereunder that such polyhedra are tetrahedra (each tetrahedron being treated separately).

Any pair of connected adjacent tetrahedra of the geological domain share three vertices, three edges and one common triangular face.

It is to be noted that "pairs" of tetrahedra which are not connected and which do not share any vertex or edge can also be defined, for the purpose of treating the case of two tetrahedra located on opposite sides of a fault surface by modelling the discontinuities generated by such fault surface in the geological domain.

The set of tetrahedra so defined generates a so called "tetrahedral 3D mesh" whose nodes correspond to the vertices of the tetrahedra while the links of said mesh correspond to the edges of the tetrahedra.

In the following, the set of all the nodes of such a mesh is noted M and each individual node is noted with a letter (m).

At any location (x,y,z) in the geological domain, it is sought to model a function g(x,y,z) which may be either scalar of vectorial; for example:

If g(x,y,z)=t(x,y,z) corresponds to the parameter (t) used in the GeoChron model, then g(x,y,z) is a scalar function taking one scalar value (t) at any point (x,y,z) in the geological domain.

If g(x,y,z)=[u(x,y,z), v(x,y,z)] corresponds to the pair of parameters (u,v) used in the GeoChron model, then g(x,y,z) is a vectorial function taking one vectorial value (u,v) at any point (x,y,z) in the geological domain.

Whatever the nature of g(x,y,z)—scalar or vectorial—for the sake of simplicity we shall adopt the following notation an assumption:

For any node (m) of M whose coordinates are (mx,my,mz), the value of g(mx,my,mz) is referred to as g(m);

The function g(x,y,z) is assumed to vary linearly inside each tetrahedron.

The function g(x,y,z) is piecewise linear in the geological domain, i.e. it is linear within each tetrahedron.

Due to the piecewise linear variation of g(x,y,z), for any point (x,y,z) located inside a tetrahedron T, the value g(x,y,z) is a linear function of the values g(m0), g(m1), g(m2), g(m3) taken by the function g(x,y,z) at the vertices m0, m1, m2, m3 of this tetrahedron.

This can be expressed by equation E1:

$$g(x, y, z) = A(m0 \mid T, x, y, z) \cdot g(m0) + A(m1 \mid T, x, y, z) \cdot g(m1) + \qquad [E1]$$
$$A(m2 \mid T, x, y, z) \cdot g(m2) + A(m3 \mid T, x, y, z) \cdot g(m3)$$

In such a linear representation of g(x,y,z), each coefficient A(m|T,x,y,z) depends on the geometry of the tetrahedron T and the position of the point (x,y,z) inside T.

More precisely, each coefficient A(m|T,x,y,z) is the so called "barycentric coordinate" of (x,y,z) relative to the vertex (m) of T.

This implies that the function g(x,y,z) is fully defined in the whole geological domain by its values on the set M of all the nodes of the tetrahedral mesh covering said geological domain.

For the sake of simplicity, the collection of all these values are assumed to be the components of a matrix G:

$$G = [g(m0), g(m1), g(m2), g(m3), g(m4), g(m5), \ldots, g(mN)]$$

As a consequence of the piecewise linear variation of g(x,y,z), it can be concluded that modelling this function is equivalent to determining the "best" matrix G, the word "best" being taken in a sense defined hereinafter.

Discrete Smooth Interpolation (DSI)

The Discrete Smooth Interpolation method (DSI) introduced in (Mallet: Discrete Smooth Interpolation in Geometric Modeling—Journal of Computer Aided Design—1992) and extensively developed chapter 4, page 139 to 197 in (Mallet: Geomodeling—Oxford University Press—2002) proposes choosing the "best" matrix G as follows.

Each information on the function g(x,y,z) is translated into a DSI constraint C consisting of a linear equation E2 linking the components of the matrix G:

$$A(m0 \mid C) \cdot g(m0) + A(m1 \mid C) \cdot g(m1) + \ldots + A(mN \mid C) \cdot g(mN) = b(C) \quad [E2]$$

The Unknown variables of this equation are the values g(m0), g(m1), . . . , g(mN).

In such a linear equation, the coefficients A(mi|C) and b(C) fully define the constraint C to be respected.

Thus, these coefficients are chosen (as illustrated by examples furtherbelow in this text) as a function of the specific constraint to be taken into account.

The set of all the linear equations corresponding to all the DSI constraints is then solved in a least square sense where the matrix G is the unknown to be determined.

Among the most popular DSI constraints, one must mention the so called "Control Point" constraint specifying that the value of g(x,y,z) at a given sampling location (x*,y*,z*) inside a tetrahedron T must be equal to a given value g*=g(x*,y*,z*).

For that purpose, taking into account the local linear variation of g(x,y,z) inside T described by equation [E1], a linear DSI constraint C* is introduced as follows:

$$A(m0 \mid T, x^*, y^*, z^*) \cdot g(m0) + A(m1 \mid T, x^*, y^*, z^*) \cdot g(m1) + \qquad [C^*]$$
$$A(m2 \mid T, x^*, y^*, z^*) \cdot g(m2) + A(m3 \mid T, x^*, y^*, z^*) \cdot g(m3) = g^*$$

This equation [C*] is a particular form of the general equation [E2] of the DSI constraint, in which only the coefficients A(m|C*)=A(m|T,x*,y*,z*) corresponding to vertices of T are not equal to zero, and b(C)=g*. Therefore, equation [C*] represents a DSI constraint.

In practice, most of the DSI constraints, including the Control Point constraints, are not sufficient to ensure the unicity of the least square solution of the DSI problem.

In order to ensure such unicity, additional constraints can be introduced to specify that, among all the possible solution, the preferred solution G must be "as smooth as possible" everywhere on the mesh M.

Different ways are possible for taking into account such a "smoothness" constraint.

The traditional method proposed in (Mallet: Geomodeling—Oxford University Press—2002) consists in specifying that the value g(m) at a given node of the mesh should be equal to the average value at neighbouring nodes linked (i.e. directly adjacent) to (m).

Such a constraint is referred to as a "Minimum Roughness" constraint and must be introduced for all the nodes of the mesh.

However, in the context of computing a 3D GeoChronic parameterization, rather than using this "Minimum Roughness" constraint, another well-suited method consists in introducing a set of "Constant Gradient" DSI constraint specifying that, for any pair of adjacent tetrahedra T1 and T2, the partial derivatives of g(x,y,z) on T1 should be equal to the partial derivatives of g(x,y,z) on T2.

More precisely, introducing such DSI Constant Gradient constraints amounts to specifying that:

if g(x,y,z)=t(x,y,z) is scalar, then there are three linear equations (of the [E2] type) specifying that the three components of the gradients of t(x,y,z) in T1 and T2 are equal;

if g(x,y,z)=[u(x,y,z),v(x,y,z)] is vectorial, then there are:

three linear equations (of the [E2] type) specifying that the three components of the gradients of u(x,y,z) in T1 and T2 are equal, and there are also three linear equations (of the [E2] type) specifying that the three components of the gradients of v(x,y,z) in T1 and T2 are equal.

Equivalently, based on the normal vector N1,2 orthogonal to the common face to T1 and T2, it is also easy to check that these DSI Constant Gradient constraints amount to specifying that:

if g(x,y,z)=t(x,y,z) is scalar, then the projections of the gradients of g(x,y,z) in T1 and T2 onto N1,2 are equal;

if g(x,y,z)=[u(x,y,z),v(x,y,z)] is vectorial, then:

the projection onto N1,2 of the respective gradients of u(x,y,z) in T1 and T2 are equal, the projection onto N1,2 of the respective gradients of v(x,y,z) in T1 and T2 are equal.

In order to correspond to valid curvilinear parameterizations of the 3D geological domain, the transfer functions u, v and t should have gradients which are never equal to the null vector.

Furthermore, the magnitude of the gradients of u(x,y,z) and v(x,y,z) should fulfil the requirement that such magnitude is as constant as possible (see: Mallet—Space-Time Mathematical Framework for Sedimentary Geology—Math. Geol., V. 36, No 1, pp. 1-32—2004).

The "Constant Gradient" DSI constraints (which are applied to all pairs of tetrahedra (T1, T2) in the geological domain) allow such requirement to be fulfilled, and are therefore particularly well suited as smoothness constraints to be used with the present invention in place of the traditional DSI smoothness constraints.

These "Constant Gradient" DSI constraints correspond to the new variant of the DSI technique mentioned above.

Hereunder are exposed the main aspects of the construction of the transfer functions t(x,y,z), as well as u(x,y,z) and v(x,y,z).

Building t(x,y,z) with DSI

Let $\{t0,t1,\ldots,tn\}$ be a series of arbitrary scalar constants sorted by increasing values, and associated to a series of horizons $\{H(t0), H(t1), \ldots, H(tn)\}$.

Although not mandatory, for the sake of clarity, the parameter ti may be considered as the geological time when the particles of sediments were deposited on the associated horizon H(ti).

In the following, the problem of building a function t(x,y,z) in the geological domain is addressed in such a way that t(x,y,z) be as much as possible equal to ti when (x,y,z) is located on the horizon H(ti).

For each horizon H(ti) a set HSP(ti) consisting of sampling points of the geological domain located on H(ti) is built.

It is then proceeded as follows to compute t(x,y,z) at the nodes of the tetrahedral mesh covering the geological domain:

For each set $\{HSP(t0), HSP(t1), \ldots, HSP(tn)\}$ and for each sampling point (x*,y*,z*) of a set HSP(ti), a DSI Control Point constraint is installed;

For each pair of tetrahedra (T1,T2), a smoothness condition (e.g. a DSI Constant Gradient constraint) is installed to ensure the smoothness of the solution;

If need be, other DSI constraints can be added (e.g., see Mallet: Geomodeling—Oxford University Press—2002).

The DSI interpolation method is then run to solve in a least square sense the system of linear equations corresponding to all the DSI constraints installed above. As a result, the values of the scalar function g(x,y,z)=t(x,y,z) at all the nodes of the tetrahedral mesh are obtained.

Building u(x,y,z) and v(x,y,z) with DSI

It shall now be explained how the functions u(x,y,z) and v(x,y,z) can be computed at the nodes of the tetrahedral mesh covering the geological domain.

Prior to building u(x,y,z) and v(x,y,z), it is assumed that the following prerequisites are fulfilled:

First, as described above, the parametric function t(x,y,z) is assumed to have already been computed at all nodes of the tetrahedral mesh.

Next, a reference surface RH(t) (typically an horizon) corresponding to an isovalue surface of the function t(x,y,z)) has been arbitrarily selected inside the geological domain. Preferably, this reference horizon should be chosen in the middle of the geological domain and should intersect the maximum number of fault blocks (the "fault blocks" being the regions of the geological domain which are bounded by the fault surfaces) of the geological domain as possible.

Finally, a surface parameterization (ur=ur(x,y,z), vr=vr(x,y,z)) of the reference horizon RH(t) is assumed to be computed. This parameterization is thus a function defined only on the reference horizon RH(t), not to be confused with the transfer functions u=u(x,y,z) and v=v(x,y,z) which are defined in the whole volume of the geological domain. For computing such a surface parameterization of RH(t), one can, for example, use the method described page 287 in (Mallet—Geomodeling—Oxford University Press—2002).

It is to be noted that, as a result of the parameterization of the reference horizon RH(t), the output of the parametric functions ur(x,y,z) and vr(x,y,z) are now known for any point (x,y,z) located on the reference horizon RH(t).

Moreover, according to the method described in section 6.5.2 page 290 and section 6.5.3 page 295 in Mallet—Geomodeling—Oxford University Press—2002, it is always possible to compute ur(x,y,z) and vr(x,y,z) in such a way that:

The modules of the gradients of ur(x,y,z) and vr(x,y,z) on RH are as much as possible constant (for example both modules equal to 1), The gradients of ur(x,y,z) and vr(x,y,z) on RH are as much as possible orthogonal between them, The respective modules of the gradients of ur(x,y,z) and vr(x,y,z) on RH are as much as possible identical.

Note that this is equivalent to saying that the contour lines on RH of ur(x,y,z) are equally spaced and are orthogonal to the contour lines on RH of vr(x,y,z) which are also equally spaced According to one embodiment of the invention, for any node (x,y,z) of the tetrahedral mesh in the geological domain, u(x,y,z) and v(x,y,z) are computed simultaneously with the DSI method in such a way that:

u(x,y,z)=ur(x,y,z) for any sampling point (x,y,z) located on the reference horizon RH. Note that such a constraint can be implemented as a DSI Control Point constraint (as described hereabove), v(x,y,z)=vr(x,y,z) for any sampling point (x,y,z) located on the reference horizon RH. Note that such a constraint can be implemented as a DSI Control Point constraint (as described hereabove), In any tetrahedron T of the mesh covering the geological domain, each of the gradient of u(x,y,z) and the gradient of v(x,y,z) must be orthogonal to the gradient of t(x,y,z). Such a constraint can be implemented as a so called "Dot product" DSI Constraint (to be further defined thereafter), In any tetrahedron T, the gradient of u(x,y,z) and the gradient of v(x,y,z) must be orthogonal between them and have the same length. Such a constraint can be implemented as a so called "Conformal Mapping" DSI Constraint (to be further defined thereafter).

"Dot product" and "Conformal Mapping" constraints can be turned into regular linear DSI Constraints corresponding to linear equations similar to equation [E2] and involving values of u(x,y,z) and v(x,y,z) at the vertices of a given tetrahedron T containing (x,y,z).

For that purpose, it is reminded that t(x,y,z) has been pre-computed and, for each tetrahedron T it is then possible to compute the unitary vector N collinear to the gradient of t(x,y,z) inside T.

It is then proceeded as follows:

Specifying that u(x,y,z) is orthogonal to N is equivalent to saying that the dot product (also called outer product or scalar product) of the gradient of u(x,y,z) with N is equal to zero. Such a dot product is linear relatively to the values of u(x,y,z) at the vertices of T and can thus be considered as a valid DSI constraint called a "Dot Product" DSI constraint (see equation [E2]). Specifying that v(x,y,z) is orthogonal to N can be achieved in a similar way.

The cross product (also called inner product or vectorial product) of the gradient of u(x,y,z) by the unitary vector N is a vector U orthogonal to N whose length is equal to the length of the gradient of u(x,y,z) and whose components are linear combination of the values of u(x,y,z) at the vertices of T. The constraint applied here is that U should be equal to the gradient of v(x,y,z)—this constraint being a linear equation involving the values of u(x,y,z) and the values of v(x,y,z) at the vertices of T: such an equation is thus a valid DSI constraint (see equation [E2]) called a "Conformal Mapping" DSI Constraint.

Similarly, the cross product (also called inner product or vectorial product) of the gradient of v(x,y,z) by the vector (−N) is a vector V orthogonal to N whose length is equal to the length of the gradient of v(x,y,z) and whose components are a linear combination of the values of v(x,y,z) at the vertices of T. The constraint applied here is that V should be equal to the gradient of u(x,y,z)—this constraint being a linear equation involving the values of u(x,y,z) and the values of v(x,y,z) at the vertices of T: such an equation is thus a valid DSI constraint (see equation [E2]) called a "Conformal Mapping" DSI Constraint.

As a result of the pair of Conformal Mapping constraints presented above, the gradients of u(x,y,z) and the gradient of v(x,y,z) should have the same length and should be orthogonal.

Moreover, as a result of the Dot Product constraint, both gradients of u(x,y,z) and v(x,y,z) should be orthogonal to the gradient of t(x,y,z).

To compute u(x,y,z) and v(x,y,z) simultaneously with the DSI method, it is possible to proceed as follows:

Define a vectorial function g(x,y,z)=[u(x,y,z),v(x,y,z)] in the whole geological domain, Choose a set of sampling points on the reference horizon RH. Such choice of the sampling points can be arbitrary—it is however preferred to chose the sampling points such that they are at least approximately uniformly distributed on RH, For each sampling point (x*,y*,z*) on the reference horizon (it is specified that the reference * in association with x,y,z means that a given sampling point is considered), identify the tetrahedron T containing this sampling point and install a pair of DSI Control Point constraints (as previously described) specifying that u(x*,y*,z*)=ur(x*,y*,z*) and v(x*,y*,z*)=vr(x*,y*,z*), For each tetrahedron T, a pair of Dot Product DSI constraints are installed to specify that both gradients of u(x,y,z) and v(x,y,z) inside T are orthogonal to the gradient of t(x,y,z), For each tetrahedron T, a pair of Conformal Mapping DSI constraints are installed to specify that the gradient of u(x,y,z) and v(x,y,z) must be orthogonal and must have the same length, For each pair of tetrahedra (T1,T2), a DSI Constant Gradient constraint is installed to ensure the smoothness of the solution, If need be, other DSI constraints may be added (e.g., see Mallet: Geomodeling—Oxford University Press—2002), The DSI interpolation method is then run to solve in a least square sense the system of linear equations corresponding to the DSI constraints mentioned above. As a result, the values of the vectorial function g(x,y,z)=[u(x,y,z),v(x,y,z)] at all the nodes of the tetrahedral mesh are obtained.

Local Evaluation of u(x,y,z), v(x,y,z) and t(x,y,z)

Once the values of the functions u(x,y,z), v(x,y,z) and t(x,y,z) are known at the nodes of the tetrahedral mesh, it is then possible to compute as follows the numerical value of each of these functions at any location (x,y,z) in the geological domain:

First, the tetrahedron T containing (x,y,z) is retrieved

Next the barycentric coordinates {A(m0|T,x,y,z), A(m1|T,x,y,z), A(m2|T,x,y,z); A(m3|T,x,y,z)} of (x,y,z) relative to the four vertices (m0, m1, m2, m3) of T are computed Finally, according to an equation similar to equation [E1], the numerical values of the functions u(x,y,z), v(x,y,z) and t(x,y,z) at location (x,y,z) are obtained as a linear combination of the values of these functions at the vertices of T weighted by the respective barycentric coordinates of (x,y,z) relative to these vertices.

For example, such a process can be used to evaluate the parameters u=u(x,y,z), v=v(x,y,z) and/or t=t(x,y,z) at any reference point inside a voxel of the 3D screen (e.g. a corner of said voxel, or its centre, . . . ).

The "Cookie-Cutter" Method—General Aspects

As mentioned above, the "cookie-cutter" method is an alternative to the "parametric" method for associating a Cell-id to a voxel.

This method is carried out for the "voxel painting step", after the definition of the voxels (which is carried out in the same way as mentioned above).

It is recalled that this method implies only one transfer function t(x,y,z)—this transfer function being the same as the function t presented above so that all comments made above about this transfer function t and the associated DSI constraints remain applicable for the cookie-cutter method.

Therefore, the computation of this transfer function t is carried out as exposed above, e.g. with a DSI technique.

In order to carry out this method, a series of increasing integer parameters {t0,t1, . . . , tn} is defined, and {H(t0), H(t1), . . . , H(tn)} is defined as the respective corresponding horizons of the geological domain, being recalled that said horizons must not be intersected by the edges of the cells to be built.

The parameters t0, t1, . . . , tn are assumed to form an arbitrary increasing series of scalar parameters corresponding to the values of the transfer function t(x,y,z) on the respective horizons H(t0), H(t1), . . . , H(tn).

The horizons {H(t0), H(t1), . . . , H(tn)} define geological layers, each geological layer being defined by its borders which are two successive horizons (associated to two respective successive parameters ti)

In practice, thanks to the DSI method, the parameter t=t(x,y,z) can be interpolated continuously at any location (x,y,z) in the geological domain in a similar way as the one which was proposed above in the frame of the "parametric" method.

As a consequence, for any point (x,y,z) in the geological domain, comparing the value of t(x,y,z) to the values {t0, t1, . . . , tn} allows the geological layer containing this point to be determined.

Indeed, for any given value of t(x,y,z), the corresponding point of the geological domain shall be included in the geological layer defined by an horizon H(ti) associated to a parameter ti smaller than t(x,y,z) and another horizon H(ti+1) associated to a parameter ti+1 greater than t(x,y,z).

As an illustration, the geological domain can thus be compared to a "cake" where the stack of "geological layers" play the role of alternate "pastry layers": Partitioning the geological domain into cells can then be viewed as the analogue of partitioning a cake with a cookie cutter.

Based on the above "Cookie-Cutter" analogy, a method for building a three-dimensional cellular partition covering a 3D geological domain is proposed. This method comprises the following steps:

Constructing a 3D screen covering the geological domain, said 3D screen being composed of elementary volumes elements (called voxels), Associating to each geological layer a respective identifier called "Layer-id", each layer being associated to a different layer identifier, Partitioning a reference horizontal (x,y) plane of the geological domain into polygons (for example rectangles, triangles, hexagons), Associating a respective identifier called "Polygon-id" to each polygon used to partition the horizontal plane of the geological domain, each polygon being associated to a different identifier, Defining a function F(L,P) in such a way that two different pairs (L,P) generate two different values for F(L,P) equal to valid Cell-ids, Associating a respective cell identifier "Cell-id" to each voxel of the 3D screen, in such a way that Cell-id=F(L,P) where L is the Layer-id containing the voxel while P is the polygon containing the vertical projection of a reference point (for example the centre) of the voxel onto the horizontal plane of the geological domain.

Here again, the cells of the geological domain are thus defined without having to code the geometry and/or topology of said cells in said geological volume.

Indirect Construction of Cells on the 3D Screen

As mentioned above, it is possible to treat all or part of the 3D screen with an "indirect" method for associating a Cell-id to the voxels of said specific area.

This indirect method can be used in particular for post-processing the voxels of specific areas of the geological domain, and change the value of the Cell-ids of said voxels after running a direct method such as mentioned above ("parametric", or "cookie-cutter" method).

The main steps of such indirect method are the following
1. For each voxel V of the 3D screen, a memory slot I=I(V) is reserved for memorizing a code corresponding to the Cell-id of the voxel,
2. A series of pairs {(S1,I1), (S2,I2), ..., (Sn,In)} is defined so that for each pair (Sk,Ik):
    Sk itself represents a series Sk={Vk1,Vk2, ... } of voxels of the 3D volume contained within the cell Ck to be built—this series Sk being referred to as a "kernel",
    Ik represents the Cell-Id associated to the future cell Ck to be built, It is to be noted that in a minimal configuration Sk can be reduced to a single voxel contained within the cell to be built, and in a maximal configuration Sk can consist in all the voxels contained in said cell to be built. Between these two extreme configurations, Sk can comprise any number of voxels contained in the cell to be built, 3. Each voxel V is "painted" by memorizing in I(V) as a Cell-id the Cell-id Ik corresponding to the pair (Sk,Ik) which fulfils the criteria that there is a voxel of the series Sk={Vk1,Vk2, ... } closer to V than any voxel of any other series Sj defined above.

Step 3 mentioned above can be carried out in a number of ways.

For example, existing methods such as the ones proposed by Saito et Toriwaki (Saito, T. et Toriwaki, J. I., (1994). New algorithms for Euclidean distance transformations of an n-dimensional digit picture with applications. Pattern Recognition, V 27, No 11, pp. 1551-1565), Ledez (Ledez, D., Modélisation d'objets Naturels par formulation Implicite. Mémoire de thèse, Institut National Polytechnique de Lorraine—Nancy, France) or Cuisenaire (Cuisenaire, O., (1999). Distance transformations: Fast algorithms and application to image processing. Thèse de doctorat, Université Catholique de Louvain) can be used for computing and memorizing in association with each voxel V the shortest distance (or its value to the square) from V to a set of given points of the geological domain.

The cells are then built as above, as the union of the voxels having the same Cell-id.

According to this indirect method, each cell Ck to be built is totally defined by a pair (Sk,Ik) as defined above.

For example, if it is desired that the frontier between two cells Ck and Ch to be built should be included in a given surface F (such as e.g. a fault or an horizon), then the series of points contained in Sk and Sh shall be defined so that there exist pairs of points (Pk, Ph) whose points Pk, Ph belong respectively to the voxels of the borders of Sk and Sh and such that the segment PkPh be cut in its middle by said surface F.

Such technique is analogous to the methods for constraining the building of non structured cells built in the state of the art (see Lepage F., (2003). Génération de maillages tridimensionnels pour la simulation des phénomènes physiques en géosciences. Mémoire de thèse, Institut National Polytechnique de Lorraine—Nancy, France).

Similarly, if it is desired to place radially cells around the path of one or several wells of the geologic domain, methods similar to those proposed for building cells (see Lepage, reference above and FIG. 8) can be used.

Hybrid Method: Taking into Account Singular Areas of the Geological Domain such as Well Paths Neighbourhoods In order to run a flow simulator on a 3D cell grid covering a geological domain and compute the flows of fluids through the domain, it can be necessary to take into account well paths traversing the geological domain.

Figure 8:
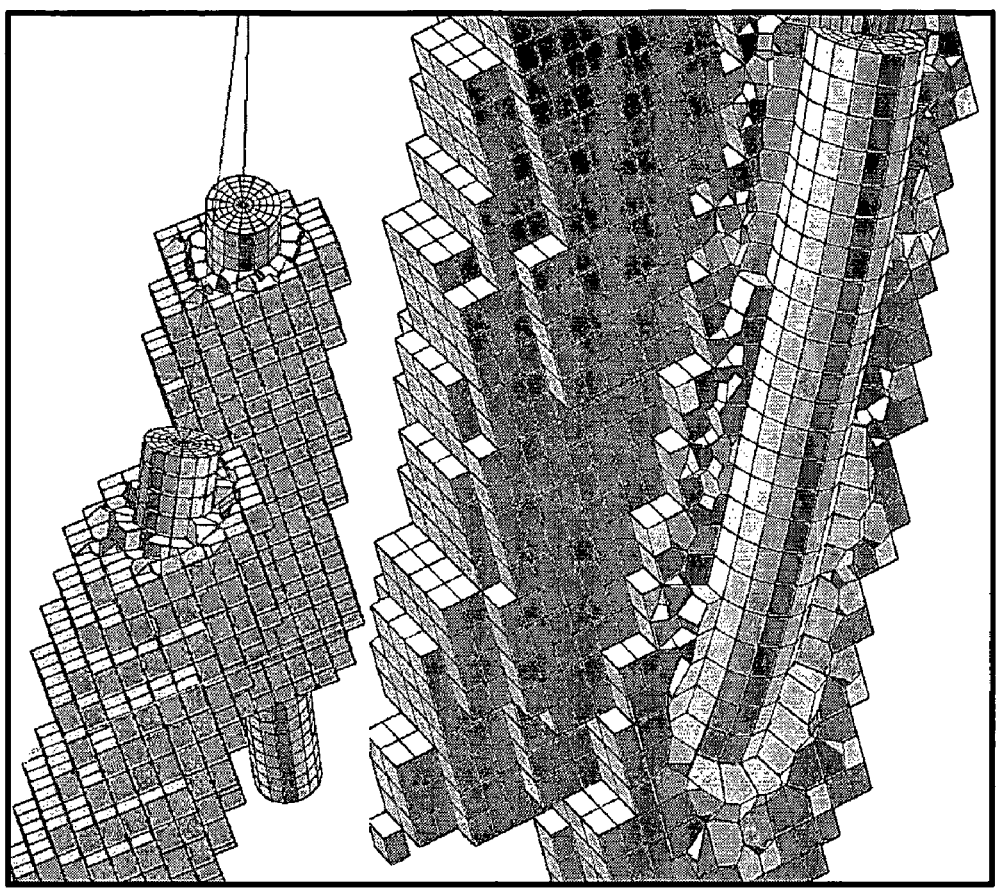
FIG. 8 is an illustration of a post-processing method of the state of the art for selectively adapting the cells of an existing 3D grid of cells, in the neighbourhood of given areas of a geological domain (here, well paths).

From a practical point of view, it is necessary to modify the cell grid in the vicinity of said well paths (e.g. see FIG. 8).

This can be achieved as follows (example for a single well path):
1. A first version of the grid is first built, using a direct or indirect method as mentioned above. This means that all the cells are defined, and associated to a valid Cell-id,
2. A distance threshold D is set and the neighbourhood W(D) of the well path is defined as the volume containing the points of the geological domain located at a distance from the well path which is smaller than the threshold D,
3. For each cell containing at least a voxel located in the neighbourhood W(D), said cell is deleted by associating to each of its voxels the code <<Cell-Undef>> as a Cell-id. Alternately, it is possible to associate to all the voxels contained in W(D) the code <<Cell-Undef>> as a Cell-id, thereby "deleting" the cells of W(D) whose voxels are all in W(D), and "eroding" the cells having some voxels in W(D)

(these voxels are "eroded" from the cell because the value of their Cell-id is brought to <<Cell-Undef>>), as well as some voxels outside W(D) (these voxels will keep their Cell-id and the cell will then be considered as comprising only these non-eroded voxels). This means that some cells are selectively deleted or eroded—and replacement cells shall be built as described hereunder, 4. For each cell Ck which no longer contains any voxel located in the neighbourhood W(D), the set (Sk,Ik) is built so that Sk be identical to the set of all voxels of Ck while Ik is equal to the Cell-id of Ck. For each cell containing at least a voxel located in the neighbourhood W(D), said cell is deleted by associating to each of its voxels the code <<Cell-Undef>> as a Cell-id. This means that some cells are selectively deleted—and replacement cells shall be built as described hereunder, 5. The indirect method which has been described above is used to build the replacement cells which shall fill the neighbourhood W(D), said indirect method being carried out on the basis of the sets {Sk,Ik} built at steps 4 and 5 above.

Hybrid Method: Taking into Account Local Heterogeneities

In order to run a flow simulator on a 3D cell grid covering a geological domain and compute the flows of fluids through the domain, it can be necessary to take into account local heterogeneities of the physical properties in a given region R of the geological domain such as, for example, those induced by channels, lenses or more generally a region with a rapid local variation of some physical property or properties.

From a practical point of view, it is necessary to refine the cell grid in such a region.

This can be achieved as follows (example for a single region):

1. A first version of the grid is first built, using a direct or indirect method as mentioned above. This means that all the cells are defined, and associated to a valid Cell-id, 2. The set W(R) of all the voxels contained in the region R is defined.

3. For each cell containing at least a voxel located in W(R), said cell is deleted by associating to each of its voxels the code <<Cell-Undef>> as a Cell-id. Alternately, said cell can be simply "eroded" (as described above, by associating to each voxel of said cell which is contained in W(R) the code <<Cell-Undef>> as a Cell-id). This means that some cells are selectively deleted or eroded—and replacement cells shall be built as described hereunder, 4. For each cell Ck which no longer contains any voxel located in the neighbourhood W(R), the set (Sk,Ik) is built so that Sk be identical to the set of all voxels of Ck while Ik is equal to the Cell-id of Ck, 5. Kernel voxels {VR1,VR2, . . . } are disposed in the region R with a local density related (e.g. proportional) to the intensity of the heterogeneity of the physical property which varies rapidly into the region R, each kernel voxel being located at the centre of the desired replacement cell to be built and so that the volume of W(R) is filled. For each kernel voxel VRk thus created, a set (Sk,Ik) is built so that kernel Sk is a set of voxels limited to the voxel VRk and Ik is a valid value for a Cell-id, which has not been used for any other cell, 6. The indirect method which has been described above is used to build the replacement cells which shall fill W(R), said indirect method being carried out on the basis of the sets {Sk,Ik} built at steps 4 and 5 above.

Postprocessing: Taking Faults into Account

It is recalled that the fault surfaces of the geological domain should not be cut by the edges of the cells to be built in the geological domain.

However, it is possible that the implementation of the methods described above generates a few cells whose edges may cut the faults.

The invention also provides a post-processing in order to treat such cells.

This post-processing is operated as follows, for each cell Ck produced by a method as mentioned above (direct, hybrid or even indirect) and cut by one or several fault surface(s) of the geological domain.

For each such cell Ck, a partition Ck={Ck1,Ck2, . . . } of Ck into smaller subsets Cki of voxels is performed, in accordance with the following criteria:

a. The centres of all voxels located in a same subset Cki are located on the same side of the fault surface (this being true for every fault surface of the geological domain);
 b. A new Cell-id is associated to each subset Cki of Ck, said Cell-id being different from all Cell-ids already used. For each voxel V of the subset which is considered, this new Cell-id is then memorized in the I(V) memory space related to the voxel.

To implement the above post-processing, it is necessary to know which voxels are crossed by the fault surfaces.

This can be achieved easily by marking as "cut" in the memory of the system which operates the invention the voxels whose, at least, one edge is cut by a fault surface.

FIG. 3 illustrates the trace of fault surfaces on the 3D screen, with the voxels cut by a fault surface being marked as "cut" which translates into a white color for the voxel on the representation of FIG. 3.

This figure also shows two horizons H(t1) and H(t2) which (as will be explained in this text) are associated to two respective values t1 and t2 of a parameter t.

Postprocessing: Improving the Shape/Size of Cells

It is also possible that the methods described above produce some cells for which it may be desired to modify the shape or size (e.g. a cell containing less than a minimum desired number of voxels, such as 50 voxels, . . . ).

The invention further provides a post-processing method for merging two adjacent cells. This is done by associating to the voxels of both adjacent cells to be merged the same Cell-id (which can be the previous Cell-id of one of the two cells to be merged).

And it is also possible to post-process the frontier between two given cells Ck, Ch by treating all or some of the voxels bordering the two cells.

More precisely, for a pair of two adjacent voxels V0 and V1 which border respectively the cells Ck and Ch, it is possible to incorporate V0 into the cell Ch (or conversely incorporate V1 into the cell Ck), by associating to said voxel V0 (resp. V1) the Cell-id of V1 (resp. the Cell-id of V0).

This allows the frontier between two adjacent cells to be modified as desired, and hence the shape of the cells.

Use of a Cell Partition Made on a 3D Screen

Once a cell partition has been built, it is of course necessary to be able to use the information associated with said partition.

This is required in particular:

for performing post-processing operations as mentioned above (it can be necessary to identify given cells or voxels, to identify the voxels in a given neighbourhood or region, . . . ), for using the cell partition in further processing, typically with a flow simulator.

As explained above, a 3D cell partition is defined by the Cell-ids associated to the different voxels of the 3D screen which underlies the cell partition.

As an illustration, FIG. 7 shows a cell built according to the invention, with a set of voxels associated to the same Cell-id.

The enlarged view of this figure shows the aliasing on the faces and edges of the cell. Said aliasing is associated to the fact that the cells are built with elementary volume elements (the voxels—which are hexahedral in the case of this figure).

Defining a minimum standard number of voxels per cell (e.g. 50) allows such an aliasing effect to be kept at an acceptable level (see e.g. FIG. 3).

Each voxel V of the 3D screen can be accessed through its index information Loc(V), and its associated Cell-id is accessible through the value of I(V) memorized in the system which operates the invention.

It is specified that in order to use the cells of the partition with a flow simulator, additional information is typically associated to each voxel for representing physical parameters of the geological domain. A typical use of the cells of the 3D screen thus implies memorizing in association with each voxel a permeability data, which can be a scalar data (from which a permeability tensor can be derived for the cell containing the voxel, as explained below).

The main elementary operations associated with the voxels/cells of the 3D screen are described below:

In order to find an arbitrary voxel V contained in a given cell whose Cell-id is known to have a given value I0, all voxels of the 3D screen and their respective associated Cell-id are scanned until such a voxel is found (i.e. I(V) of the voxel=I0). This scanning can be a sequential scan of all voxels in a predetermined order which is fixed, but the scanning of the voxels can also be optimized by using e.g. an octree method known in the computational geometry, In order to find the voxel of the 3D screen which contains a given point P(x,y,z) having coordinates (x,y,z) in the referential of the geological domain, and assuming that the three dimensions of the 3D screen are parallel to the three respective axis X, Y, Z of said referential and that all voxels are identical hexahedra, the searched voxel shall be identified by a given line (i), column (j) and plane (k) of the 3D screen. These elements are found as follows:

$i$=integer part of $(x-x0)/DX$ $j$=integer part of $(y-y0)/DY$ $k$=integer part of $(z-z0)/DZ$, with (x0,y0,z0) the coordinates in the referential of the geological domain of the origin of the 3D screen and (DX,DY,DZ) the respective dimensions of each voxel along directions X, Y, Z In order to determine the Cell-id of a cell containing a given voxel V, the value I(V) memorized in association with said voxel V is read, In order to determine the set Wc of all voxels of a 3D screen which belong to a given cell C containing a given voxel Vc associated to a Cell-id I(Vc), a method consists in scanning the voxels of the 3D screen through successive concentric adjacent "rings" centered on said given voxel Vc.

A "ring" is defined as a domain of the 3D screen (i.e. a collection of voxels) defined by the volume difference between a first "sphere" (in the sense of the so-called "Manhattan" geometry in the case where all the voxels are identical hexahedra) and a second "sphere" which is concentric and adjacent to the first sphere, and of a greater radius.

Each of the concentric "rings" is thus defined by the difference between a given sphere of a series of concentric spheres (in the sense of the so-called "Manhattan" geometry in the case where all the voxels are identical hexahedra) and the sphere adjacent in said series of spheres.

It is specified that the size of the spheres of the series (and hence the size of the successive rings) can increase with a given increment.

Through such scanning, the information I(V) of each scanned voxel is read and only the voxels having a I(V) equal to I(Vc) are retained. The scanning stops as soon as one of the successive concentric rings does not contain any voxel associated to the value I(Vc), In order to find a set N(Vc) of voxel composed of voxels belonging to cells adjacent to a cell C which contains a given voxel Vc associated to a Cell-id I(Vc), said set N(Vc) containing only one voxel of each such cell adjacent to the cell C, the following steps are carried out:

Starting from Vc, all voxels of the 3D screen associated to the same Cell-id I(Vc) are identified by successive rings (as described above), this forming a first set of voxels, From the voxels of this first set only the voxels which are adjacent in the 3D screen to a voxel associated to a Cell-id different from I(Vc) are retained, this forming a second set of voxels, From this second set of voxels, the redundancies are furthermore eliminated (i.e. for a given Cell-id, only one voxel is finally retained), in order to produce the desired set N(Vc), In order to determine the volume of a cell C containing a given voxel Vc, a possible method is as follows:

In a first step, the set Wc of all voxels V associated to the same Cell-id as Vc is defined (see above), The number n of voxels in Wc is counted, Assuming that all voxels have the same volume (the most practical configuration being the one where all voxels are identical), the volume of C is computed as n times the volume of a voxel, In order to define a common face F(C0,C1) shared by two adjacent cells C0, C1 associated to respective Cell-ids id0 and id1, such common face F(C0,C1) is defined as the set of all pairs of adjacent voxels (V0,V1) such that V0 belongs to C0 while V1 belongs to C1. To retrieve F(C0,C1), one can proceed as follows:

An empty set F(C0,C1) of pair of voxels is created,

An empty set W0 of voxels is created

For each voxel V0 of C0, V0 is inserted into W0 if and only if, at least, one of the neighbouring voxels of V0 is associated to a Cell-id equal to the Cell-id id1 of C1, For each voxel V0 of W0, and for each voxel V1 adjacent to V0, a pair (V0,V1) is created and inserted into F(C0,C1) if and only if V1 is holding a Cell-id equal to the Cell-id id1 of C1.

The above illustrates using the voxels of C0 as the starting base of the method (creation of W0 from voxels of C0). It is of course possible to start instead from C1, and build a set W1 in order to build F(C0,C1).

It should be noticed that F(C0,C1) contains both the topology and the geometry of the face shared by C0 and C1:

The topology of the face (i.e. in particular the identity of the cell adjacent to the face) is encoded by the Cell-ids stored in any pair of voxels (V0,V1) belonging to F(C0,C1) which allows the two cells C0 and C1 to be retrieved as the cells whose associated Cell-ids are those stored in V0 and V1, The geometry of the face is encoded by the set of common facets shared by all the pairs of voxels (V0,V1) belonging to F(C0,C1): the juxtaposition of these adjacent facets allows the geometry of the entire face F(C0,C1) to be reconstructed (the "facets" are defined as the elementary faces of the voxels).

In order to determine a permeability tensor of a cell C containing a given voxel Vc, it is possible to proceed as follows:

It is assumed that a scalar permeability has been associated to each voxel V. For that purpose, a GeoChron method can be used (see e.g. Mallet, J. L., (2004)—Space-Time Mathematical Framework for Sedimentary Geology. Math. Geol., V. 36, No. 1, pp. 1-32), All voxels contained in the cell C are identified, thus building a set Wc (see above), A technique of upscaling can be used for computing an equivalent permeability tensor for the cell C. For that purpose it is possible to use e.g. methods described in Mallet, J. L., (2004)—Space-Time Mathematical Framework for Sedimentary Geology. Math. Geol., V. 36, No. 1, pp. 1-32, and in Wen, X. H., Durlovsky, L. J. and Edwards, M. G., (2003)—Use of Border Region for Improved Permeability Upscaling. Math. Geol., V. 35, No. 5, pp. 521-547. It is specified that if it is required by the technique used to perform the upscaling, it may be necessary to add to Wc a subset of voxels contained in a neighbourhood of Wc.

Of course, the elementary operations described above can be combined. As examples, it is possible to e.g.:

Directly determine the cell to which a given point of the geological domain belongs, Directly determine the cells adjacent to a given cell, Directly determine the volume of a cell Directly determine the surface contact area between a given cell and one of its adjacent cells, Directly determine the permeability tensor for a given cell.

Such operations can be carried out using exclusively information memorized in association with the 3D screen (the last operation mentioned—determination of the permeability tensor—requiring in addition permeability values for each voxel).

The invention claimed is:

1. A computer-implemented method for building a three-dimensional (3D) cellular partition covering a 3D geological domain by defining the cells of the partition, wherein said method comprises the following steps:

a "3D screen construction step" for constructing a 3D screen which is a 3D elementary partition representing a geological volume in the geological domain, the partition covering the geological domain, said 3D screen being composed of a plurality of voxels (Vi) which are elementary volume elements, "voxel" painting step for associating a cell identifier (Cell-id) to each voxel, "cell definition step" for defining the cells of the geological domain, each cell of the geological domain being defined as the subset of voxels of the 3D screen associated to the same cell identifier, thereby allowing the definition of the cells of the geological domain without having to code the geometry and/or topology of said cells in said geological volume.

2. A method according to claim 1 wherein the method further comprises associating to each voxel (Vi) an individual index information (Loc(Vi)) which characterizes the location of said voxel in the 3D screen and allows the retrieving of the voxels neighbouring said voxel in the 3D screen.

3. A "parametric" method using a method according to claim 2, wherein said parametric method further comprises the following steps:

Constructing three transfer functions ($u=u(x,y,z)$, $v=v(x,y,z)$, $t=t(x,y,z)$) defined from the geological domain to a parametric domain for associating each point $(x,y,z)$ in the geological domain to an image point $(u,v,t)$ in the parametric domain, Partitioning the parametric domain into parametric cells, Associating a respective cell identifier (Cell-id) to each parametric cell of the parametric domain, each parametric cell being individually associated to a respective cell identifier, After the 3D screen construction step, associating to each voxel of the 3D screen the cell identifier of the parametric cell in the parametric domain which contains the image point $(u,v,t)$ of a point $(x,y,z)$ contained in said voxel.

4. A parametric method according to claim 3, wherein the parametric domain is a 3D domain and three transfer functions ($u=u(x,y,z)$, $v=v(x,y,z)$, $t=t(x,y,z)$) are respectively defined from the geological domain into one of the three respective dimensions $(u,v,t)$ of the parametric domain.

5. A parametric method according to claim 3, wherein said or one of said transfer function ($t(x,y,z)$) is defined so that the image of each horizon of the geological domain is a plane in the parametric domain.

6. A parametric method according to claim 5, wherein the partitioning of the parametric domain into parametric cells is carried out in such a way that no edge or face of a parametric cell crosses a plane corresponding to an image of an horizon of the geologic domain.

7. A parametric method according to claim 1, wherein said transfer functions ($u=u(x,y,z)$, $v=v(x,y,z)$, $t=t(x,y,z)$) are built according to the GeoChron model.

8. A parametric method according to claim 7, wherein the building of said transfer functions implies the following operations:

Covering the geological domain with a 3D mesh consisting of adjacent polyhedra whose edges never cross the fault surfaces of the geological domain, each of said polyhedra being a tetrahedron or the union of adjacent tetrahedra, Reserving memory slots for coordinate(s) $(u,v,t)$ in the parametric domain associated to each vertex of each tetrahedron, Assuming that the transfer functions ($u=u(x,y,z)$, $v=v(x,y,z)$, $t=t(x,y,z)$) are linear inside each tetrahedron and that each transfer function is thus fully defined within said tetrahedron by its values at the vertices of said tetrahedron, Computing the values ($t(x,y,z)$) of a given transfer function (t) at the vertices of said tetrahedral of the geological domain, Computing the values ($u(x,y,z)$, $v(x,y,z)$) of the transfer function(s) $(u,v)$ other than said given transfer function (t), at the vertices of said tetrahedral of the geological domain.

9. A parametric method according to claim 8, wherein each of said coordinate(s) (u,v,t) corresponds to a sampling value for a respective transfer function at the location (x,y,z) of a tetrahedron vertex and the computation of the transfer function(s) is carried out at the location (x,y,z) of each vertex of a tetrahedron in the parametric domain.

10. A parametric method according to claim 8, wherein said computation of the values of said given transfer function (t) is made with a DSI method carried out on the basis of the values (t) of said given transfer function at horizons (H(t)) of the geological domain, said given transfer function being assumed to have a respective constant value on each given horizon of the geological domain.

11. A parametric method according to claim 9, wherein said computation of the values of said given transfer function (t) is made at the location of each vertex of each tetrahedron with a DSI method carried out on the basis of the values (tj) of said given transfer function (t) at each horizon (H(ts)) of the geological domain.

12. A parametric method according to claim 8, wherein said polyhedra are chosen as tetrahedra.

13. A parametric method according to claim 12, wherein said computation of the values of said other transfer function(s) (u,v) is carried out through the following steps:
Defining a reference surface in the geological domain,
Computing said values of each of said other transfer function(s) (u,v) through a DSI method carried out on the basis of the values of said other transfer function at said reference surface of the geological domain.

14. A parametric method according to claim 13, wherein said reference surface of the geological domain is chosen as an horizon of said geological domain.

15. A parametric method according to claim 14, wherein said reference surface of the geological domain is chosen as an horizon which intersects a maximum number of faults blocks of the geological domain.

16. A parametric method according to claim 15, wherein there are two said other transfer functions (ur,vr) defined on said reference surface and said reference surface is chosen so that on said reference surface the gradients of a first of said other transfer function (ur) are as much orthogonal as possible to the gradients of the second of said other transfer function (vr) and said gradients have as much as possible constant lengths.

17. A parametric method according to claim 10, wherein said DSI method for computing the values of a transfer function on the basis of the values of said transfer function at the image of a horizon surface implies the following steps:
Discretizing said horizon surface as a finite set of points considered as DSI Control Points,
Computation of said transfer function at DSI Control Points on said horizon surface,
For each DSI Control Point:
Identification of the tetrahedron which contains the DSI Control Point,
Formulation of a DSI constraint associated to the DSI Control Point, said DSI constraint corresponding to equating the barycentric mean of the values of said transfer function at the vertices of said tetrahedron to the known value of said transfer function at said DSI Control Point.

18. A parametric method according to claim 17, wherein said DSI method for computing the values of a transfer function further comprises applying to the values of said transfer function at the vertices of the tetrahedra a smoothing condition linking the values of said transfer function at the vertices of neighbouring tetrahedra of the geological domain.

19. A parametric method according to claim 18, wherein said smoothing condition is a condition of a minimal difference between the value of said transfer function at a given tetrahedron vertex location and an average value at neighbouring tetrahedron vertices in the geological domain.

20. A parametric method according to claim 18 wherein said smoothing condition for any pair of adjacent tetrahedra (T1, T2) consists in specifying that the gradients of said transfer functions should be as equal as possible in said adjacent tetrahedra.

21. A parametric method according to claim 18 wherein said smoothing condition for any pair of adjacent tetrahedron (T1, T2) consists in specifying that the respective projections, on the normal vector to the common face shared by said two adjacent tetrahedra, of the gradients of said transfer functions in said adjacent tetrahedra, should be equal.

22. A parametric method according to claim 17, wherein the computation of said two other transfer functions (u,v) is carried out using the knowledge of the earlier computation of said given transfer function (t).

23. A parametric method according to claim 22, wherein the method further comprises specifying that within each tetrahedron the gradient of each of said two other transfer functions (u,v) is orthogonal to the gradient of said given transfer function (t).

24. A parametric method according to claim 22, wherein within each tetrahedron the method further comprises specifying that the gradients of said two other transfer functions (u,v) are constrained to be orthogonal between them, and the respective lengths of said gradients of said two other transfer functions (u,v) are constrained to be substantially equal.

25. A parametric method according to claim 1, wherein said point (x,y,z) contained in the voxel and whose image point is contained in the parametric cell having a Cell-id which is associated to the voxel is an arbitrary point of the voxel.

26. A "cookie-cutter" method using a method according to claim 2, said cookie-cutter method further comprising the following steps:
Associating to each geological layer of the geological domain a respective layer identifier (Layer-id), each layer being individually associated to a respective layer identifier,
Partitioning a reference surface of the geological domain into polygons,
Associating a respective polygon identifier (Polygon-id) to each polygon used to partition said reference surface, each polygon being individually associated to a respective polygon identifier,
Defining a layer-polygon function which associates a value (F(L1P)) to each pair (L, P) formed of a Layer identifier and a Polygon identifier in such a way that each pair (L1P) is associated to a respective value (F(L1P)) generated by said layer-polygon function and consisting of a valid cell identifier,
Computing for each voxel of the geological domain a voxel value of said layer-polygon function which is the output of said layer-polygon function computed on the basis of:
the Layer identifier (L) of the layer containing said voxel, and
the Polygon identifier (P) of the polygon of said reference surface which contains the projection of a reference point of said voxel over said reference surface, along a projection direction, Associating to each voxel a cell identifier (Cell-id) which is equal to the voxel value (F(L1P)) of the layer-polygon function computed at a reference point contained in the voxel.

27. A cookie-cutter method according to claim 26, wherein the method comprises constructing a transfer function (t=t(x, y,z)) defined in the geological domain for associating each point (x,y,z) in the geological domain to a value t((x,y,z).

28. A cookie-cutter method according to claim 27, wherein the building of said transfer function implies the following operations:
   Covering the geological domain with a 3D mesh consisting of adjacent polyhedra whose edges never cross the fault surfaces of the geological domain, each of said polyhedra being a tetrahedron or the union of adjacent tetrahedra,
   Reserving memory slots for the values of said transfer function (t(x,y,z)) at each vertex of each tetrahedron,
   Assuming that the transfer function (t=t(x,y,z)) is linear inside each tetrahedron and that said transfer function is thus fully defined within said tetrahedron by its values at the vertices of said tetrahedron,
   Computing the values (t(x,y,z)) of said transfer function (t) at the vertices of all tetrahedral of the geological domain.

29. A cookie-cutter method according to claim 26, wherein said reference surface is an horizontal plane of the geological domain.

30. A cookie-cutter method according to claim 29, wherein said projection direction is the vertical direction of the geological domain.

31. A cookie-cutter method according to claim 30, wherein said reference point of each voxel is the centre of the voxel.

32. A method according to claim 1, wherein the voxels are defined so that the volume of each voxel is significantly smaller than the volume of the cell of the geological domain which contains the voxel.

33. A method according to claim 32, wherein the ratio of the volume of each voxel to the volume of the cell of the geological domain containing said voxel is at least 1:50.

34. A method according to claim 1, wherein said method includes a post-processing of desired voxels in order to selectively modify the cell identifiers of said voxels after the cell definition step.

35. A method according to claim 34, wherein said post-processing is applied to voxels primarily associated to the cell identifier of a first cell, and being adjacent to a border of said first cell with a second cell, and the new cell identifier associated to said voxel is the cell identifier of said second cell.

36. A method according to claim 1, wherein after the cell definition step the method further comprises the retrieving of the voxels contained in a cell which also contains a given voxel, by exploring recursively from said given voxel through successive concentric rings all the voxels which are associated to the same cell identifier as said given voxel.

37. A method according to claim 1, wherein after the cell definition step the method further comprises the identification of the cells adjacent to a cell containing a given voxel by retrieving the voxels which are associated to a cell identifier different from the cell identifier of said cell containing said given voxel and are also adjacent to at least one voxel of said cell containing said given voxel.

38. A method according to claim 1, wherein after the cell definition step the method further comprises the computation of the volume of any given cell as being equal to the sum of the volumes of all the voxels associated to the same cell identifier as a given voxel of said given cell.

39. A method according to claim 1, wherein the method further comprises after the cell definition step the construction for any given pair of adjacent cells (C1, C2) of the face F(C1, C2) separating said two adjacent cells, said face being built as the set of all pairs of adjacent voxels such that a first voxel of said pair belongs to a first of said two adjacent cells and the second voxel of said pair belongs to the second of said two adjacent cells.

40. A method according to claim 1, wherein in association with each voxel the cell identifier associated to the voxel is memorized.

41. A method according to claim 40, wherein in association with each voxel at least a parameter representative of a physical property of the geological volume corresponding to the voxel is also memorized.

42. A method according to claim 41, wherein said at least one parameter representative of a physical property of the geological volume corresponding to the voxel is limited to one scalar permeability parameter.

43. A method according to claim 42, wherein the method further comprises the computation of a tensor of permeabilities for each cell, said computation being deduced from scalar permeabilities associated to the voxels of said cell.

44. A method according to claim 43, wherein the computation of a tensor of permeabilities of a cell is further based on scalar permeabilities associated to some voxels in the neighbourhood of said cell.

45. A method according to claim 1, wherein said 3D screen consists of a plurality of adjacent hexahedral voxels aligned according to three sets of straight lines corresponding to the three dimensions of the geological domain.

46. A method according to claim 45, wherein the lines of each set are regularly spaced and all voxels of the 3D screen are identical.

47. A method according to claim 26, wherein the method includes a specific post-processing of cells associated to some singular geological surfaces within the geological domain by memorizing the equations F(x,y,z) of said singular surfaces and dividing each cell of the three-dimensional partition which is intersected by such singular surfaces into at least two subcells, each subcell being entirely located on a same side of said singular surface.

48. A method according to claim 47, wherein the singular surfaces which are treated specifically include fault surfaces of the geological volume.

49. A method according to claim 47, wherein said dividing of cells traversed by said singular surfaces include the following steps:
   For each traversed cell, defining subsets of voxels whose centres are all located on a same side of said singular surface,
   Assigning to each such subset of voxels a new cell identifier which is different from the cell identifiers assigned to other cells,
   Assigning to all voxels of each such subset of voxels a new cell identifier equal to the cell identifier assigned to the subset of voxels it belongs to.

50. A method according to claim 1, wherein the method includes a specific post-processing of some specific volumes within the geological domain by defining the cells of said specific volumes with an "indirect" method which comprises the following steps for each of said specific volumes:
   Resetting the Cell-id of all voxels within said volume,
   Defining for each cell to be defined within said specific volume a "kernel", each kernel being composed of one or more voxels, Associating to each kernel a Cell-id which has not been still assigned, Associating to each voxel within said specific volume the Cell-id of the kernel which is closest to said voxel, Defining each cell of said specific volume as the subset of voxels of the 3D screen associated to the same Cell-id.

51. A method according to claim 50, wherein in order to obtain a given desired geometry for an interface between two cells which are to be defined within a said specific volume according to said indirect method, respective kernels of said two cells are defined as follows:

A kernel is defined for a first of said two cells to be defined with at least a voxel of a first of said two cells, said voxel being chosen so as to be bordering or close to the desired interface, For each voxel of said kernel of a first cell to be defined ("first voxel") and bordering or close to the desired interface, the voxel ("symmetrical voxel") which is symmetrical of said first voxel with reference to the desired interface is identified, A kernel is defined for the second of said two cells to be defined, with the symmetrical voxel(s) thus defined.

52. A method according to claim 50, wherein the kernels positions and the kernel density are defined so as to obtain a desired general configuration for the cells of said specific volumes.

53. A method according to claim 52, wherein said specific volume is defined by a given distance around a well path of the geological volume and the kernels are defined so that within said specific volume the kernel density is higher in the vicinity of said well path.

54. A method according to claim 52, wherein said specific volume is defined by a region of rapid variation of at least one physical property and the kernels are defined so that they are associated to a local density which is related to the intensity of heterogeneity of said physical property.

* * * * *